(12) United States Patent
Cook et al.

(10) Patent No.: US 11,965,677 B2
(45) Date of Patent: Apr. 23, 2024

(54) SYSTEM, METHOD, AND COMPOSITION FOR GEOTHERMAL HEAT HARVEST

(71) Applicant: Sage Geosystems Inc., Bellaire, TX (US)

(72) Inventors: Robert Lance Cook, Houston, TX (US); Lev M. Ring, Bellaire, TX (US)

(73) Assignee: Sage Geosystems Inc., Bellaire, TX (US)

( * ) Notice: Subject to any disclaimer, the term of this patent is extended or adjusted under 35 U.S.C. 154(b) by 119 days.

(21) Appl. No.: 17/351,206

(22) Filed: Jun. 17, 2021

(65) Prior Publication Data

US 2021/0396430 A1 Dec. 23, 2021

Related U.S. Application Data

(60) Provisional application No. 63/051,364, filed on Jul. 13, 2020, provisional application No. 63/040,316, filed on Jun. 17, 2020.

(51) Int. Cl.
| | |
|---|---|
| *F24T 10/17* | (2018.01) |
| *E21B 43/267* | (2006.01) |
| *F24T 10/00* | (2018.01) |
| *E21B 36/00* | (2006.01) |
| *E21B 47/07* | (2012.01) |
| *F24T 50/00* | (2018.01) |

(52) U.S. Cl.
CPC ............ *F24T 10/17* (2018.05); *E21B 43/267* (2013.01); *E21B 36/00* (2013.01); *E21B 47/07* (2020.05); *F24T 2010/56* (2018.05); *F24T 50/00* (2018.05)

(58) Field of Classification Search
CPC ...... F02C 9/24; F02C 1/04; F02C 1/10; F02C 1/105; F02C 9/16; F01D 15/10; F01K 3/02; F01K 3/06; F01K 3/12; F01K 3/18; F01K 7/38; F01K 13/02; F01K 25/103; F01K 25/06; F22B 1/006; Y02E 20/16
See application file for complete search history.

(56) References Cited

U.S. PATENT DOCUMENTS

| | | |
|---|---|---|
| 3,827,243 A | 8/1974 | Paull |
| 3,954,142 A | 5/1976 | Broaddus et al. |

(Continued)

FOREIGN PATENT DOCUMENTS

WO 2019067618 A1 4/2019

OTHER PUBLICATIONS

International Search Report for International Application No. PCT/US2021/037965, dated Nov. 26, 2021, 18 pgs.

(Continued)

*Primary Examiner* — Mickey H France
(74) *Attorney, Agent, or Firm* — Patterson + Sheridan, LLP

(57) ABSTRACT

A system, composition and method for controlling fracture grown in the extraction of geothermal energy from an underground formation includes (i) introducing a first fracking fluid into an underground formation; (ii) introducing a second fracking fluid into the underground formation; wherein the specific gravity of the second fracking fluid is different from the specific gravity of the first fracturing fluid, thereby controlling the growth of at least one fracture in a downward direction, and wherein the fracking fluid in at least one of steps (i) or (ii) contains proppant particles having a thermal conductivity contrast of at least 5.

11 Claims, 23 Drawing Sheets

(56) References Cited

U.S. PATENT DOCUMENTS

| | | |
|---|---|---|
| RE30,484 E | 1/1981 | Broaddus |
| 4,478,282 A | 10/1984 | Nolte et al. |
| 4,515,214 A | 5/1985 | Fitch |
| 4,887,670 A | 12/1989 | Lord |
| 5,159,979 A | 11/1992 | Jennings, Jr. |
| 5,411,091 A | 5/1995 | Jennings, Jr. |
| 5,875,843 A | 3/1999 | Hill |
| 8,839,865 B2 | 9/2014 | Willberg et al. |
| 10,619,088 B2 | 4/2020 | Nguyen et al. |
| 2006/0280559 A1 | 12/2006 | Allen |
| 2009/0308613 A1 | 12/2009 | Smith |
| 2010/0288465 A1 | 11/2010 | Stewart |
| 2011/0036583 A1 | 2/2011 | Willberg et al. |
| 2012/0003136 A1 | 1/2012 | Skala |
| 2012/0145390 A1 | 6/2012 | Parse et al. |
| 2012/0175077 A1 | 7/2012 | Lehmann |
| 2013/0056171 A1 | 3/2013 | Klemencic |
| 2013/0075057 A1 | 3/2013 | Johnson |
| 2013/0232973 A1 | 9/2013 | McBay |
| 2013/0341030 A1 | 12/2013 | Brannon |
| 2014/0060826 A1 | 3/2014 | Nguyen |
| 2015/0176929 A1 | 6/2015 | Wray |
| 2015/0292774 A1 | 10/2015 | Kang |
| 2016/0084051 A1 | 3/2016 | Vinegar |
| 2016/0168452 A1 | 6/2016 | Cannan |
| 2017/0152728 A1 | 6/2017 | Abou-Sayed et al. |
| 2017/0299226 A1 | 10/2017 | Buscheck |
| 2017/0355899 A1 | 12/2017 | Li |
| 2018/0224164 A1 | 8/2018 | Lakic |
| 2018/0238159 A1 | 8/2018 | Nguyen |
| 2018/0274524 A1 | 9/2018 | Moncarz |
| 2018/0298266 A1* | 10/2018 | Marr ................ C09K 8/00 |
| 2019/0040296 A1 | 2/2019 | Panamarathupalayam |
| 2019/0128068 A1 | 5/2019 | Danko |
| 2019/0330520 A1 | 10/2019 | Cannan |
| 2020/0011151 A1 | 1/2020 | Toews |
| 2020/0165909 A1 | 5/2020 | Cook |
| 2021/0356174 A1 | 11/2021 | Alharbi |

OTHER PUBLICATIONS

International Preliminary Report on Patentability for International Application No. PCT/US2021/037965, dated Dec. 29, 2022, 14 pgs.

Office Action issued for Canadian Patent Application No. 3,120,964 on Dec. 5, 2023, 11 pgs.

Non-Final Office Action for U.S. Appl. No. 18/011,075, issued on Jan. 17, 2024, 46 pgs.

* cited by examiner

How fracks grow. High Fluid Weight Frack Fluid

- Frack Fluid in well is 1.5 psi/ft
  * Pressure at top of frack is 1350 psi
  * Pressure at perf is 1500 psi
  * Pressure at bottom of frack is 1650 psi

- Frack Gradient for formation is 1.0 psi/ft
  * Frack pressure at top of frack is 900 psi
  * Frack Pressure at perf is 1000 psi
  * Pressure at bottom of frack is 1100 psi

- If pumps simply keep the hole full with the 1.5 psi/ft fluid, the pressure at the top and the bottom of the frack will be 450 and 550 psi over the frack gradient (respectively).

- Thus the frack will grow in all directions in 2 dimensions with a bias toward downward growth.

- Thus, all things being equal, fracture fluids can be designed which will steer the frack to have a bias toward downward growth by having the gradient of the fluid exceed the rock's fracture gradient.

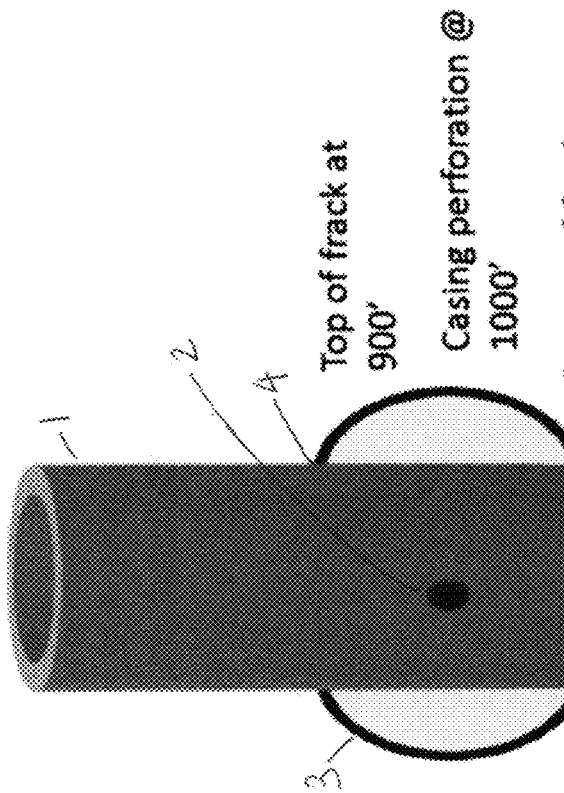

Top of frack at 900'

Casing perforation @ 1000'

Bottom of frack at 1100'

*Imagine perfect penny shaped fracture exists around a casing perforation*

FIG. 3

How fracks grow: Heavy weight fluid displaced by light weight fluid

- Frack Fluid in well bore is .5 psi/ft
  - Pressure at perf is 500 psi

- Frack Fluid displaced in to the fracture is 1.5 psi/ft
  - Pressure at top of frack is 350 psi
  - Pressure at perf is 500 psi
  - Pressure at bottom of frack is 650 psi

- Frack Gradient for formation is 1.0 psi/ft
  - Frack pressure at top of frack is 900 psi
  - Frack Pressure at perf is 1000 psi
  - Pressure at bottom of frack is 1100 psi

- When the light weight .5 psi/ft frack fluid has reached the perf while displacing the 1.5 psi/ft frack fluid, the surface pressure will be 450 psi.

- Note that the pressure to frack the bottom of the frack is equaled at 450 psi. While we are still 100 psi short of growing the fracture up. Thus the frack will grow strictly down until a balance is reached in the fracture of low gradient .5 psi/ft fluid and 1.5 psi/ft fluid.

- Thus, all things being equal, fractures tend to grow down when the fluid inside the fracture is dominated by a fluid which greater than the frack gradient.

Top of frack at 900'

Casing perforation @ 1000'

Bottom of frack at 1100'

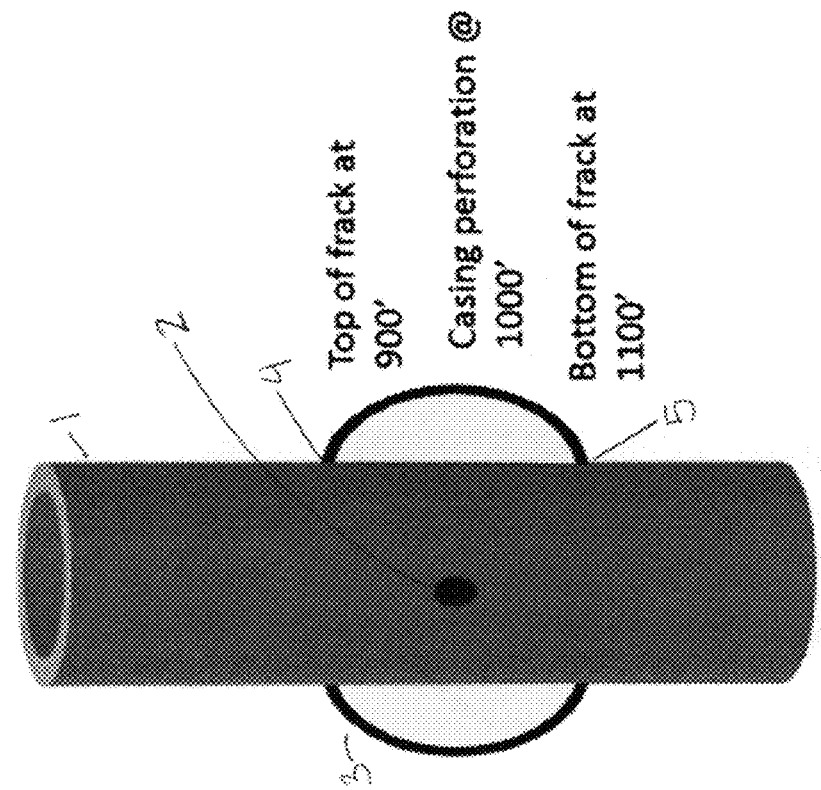

*Imagine perfect penny shaped fracture exists around a casing perforation*

FIG. 4

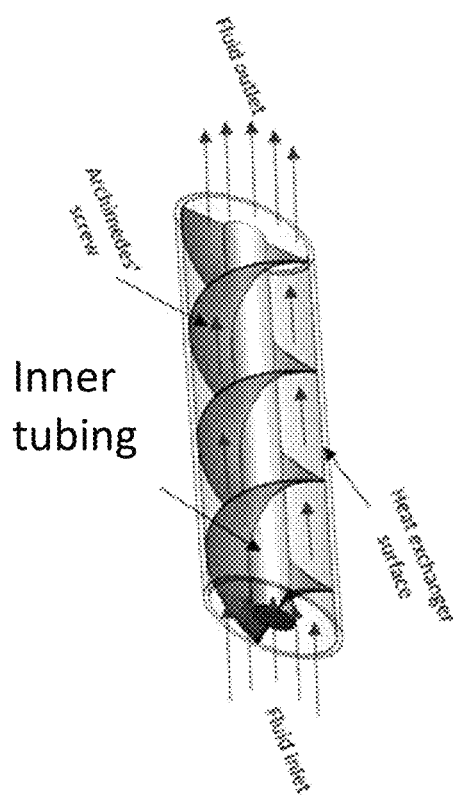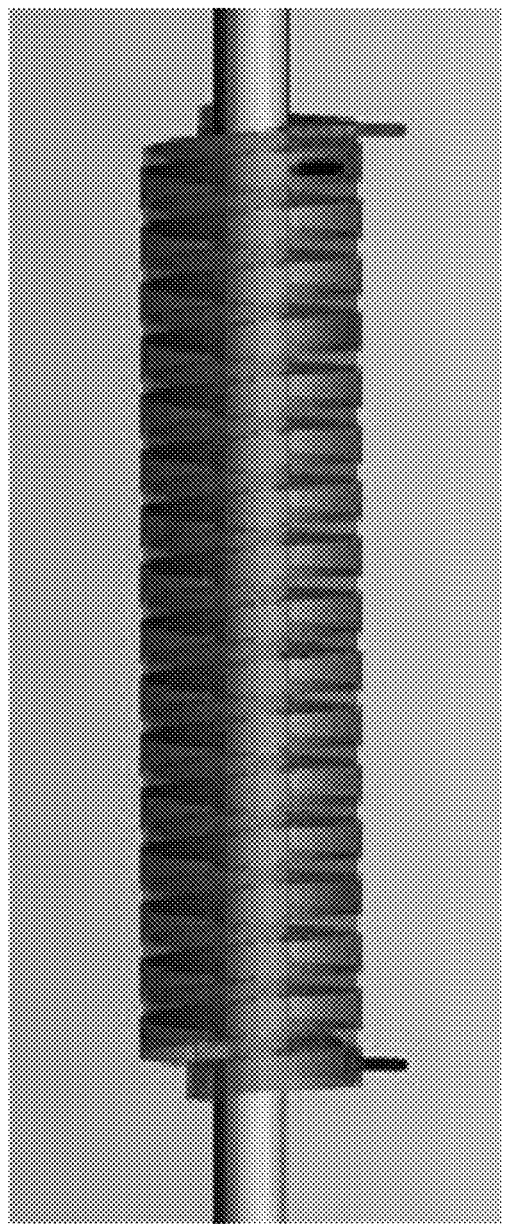
FIG. 11

Finger-like sinking gravity fractures
*Taisne et al.* [2009]

Finger-like sinking gravity fractures
*Taisne et al.* [2009]

Turbine Generator Turning Flow of the Well's Fluid Back into Energy

In this embodiment, the flow back fluid can be used to run a turbine.

In this embodiment, rather than a choke to create back pressure to drive fluid into the fracture network, flow can be diverted through a turbine to create back pressure.

SYSTEM, METHOD, AND COMPOSITION FOR GEOTHERMAL HEAT HARVEST

CROSS REFERENCE TO RELATED APPLICATIONS

This application claims priority to U.S. Provisional Application 63/040,316, filed Jun. 17, 2020, and U.S. Provisional Patent Application 63/051,364, filed Jul. 13, 2020, which are incorporated by reference in their entirety.

FIELD OF THE INVENTION

This disclosure relates to systems, methods, and compositions for harvesting geothermal heat. The invention involves the fracturing of a subterranean formation to depths providing access to higher temperatures towards the Earth's core, drilling and constructing a cased well, and circulating working fluid in the concentric wellbore to bring heat to the surface. The invention also involves systems, methods, and compositions for controlling fracture growth, creating fractures with heat conductive material, and accessing and harvesting geothermal heat and bringing it to the Earth's surface for use as an energy source.

BACKGROUND OF THE INVENTION

Hydraulic fracturing, or fracking, is a common process for extracting oil and/or gas from a well. Fracking generally is used to create fractures in a rock formation by injecting the rock with a pressurized liquid. High pressure injection of a fracking fluid into a wellbore creates cracks in rock formations through which natural gas and oil will flow more freely. When the hydraulic pressure is removed from the well, grains of hydraulic fracturing proppants can hold the fractures open.

The control of fracture growth is a common problem in fracking operations. Conventional fracking fluids generally have a lower hydrostatic head gradient than the formation's fracture gradient, thereby causing fractures to have a tendency to grow in an upward direction. This tendency to grow upward also manifests itself in a common complaint that in vertical wells, most frack fluid pumped in a well that is perforated in multiple zones goes into the shallowest perforated zone. U.S. Provisional Application 62/771,501, filed Nov. 26, 2018, and PCT/US19/63378, filed Nov. 26, 2019, which published as WO 2020/112857, provide one technique for improving fracking of formations to access oil and gas.

Deep geological repositories have also been generated through fracking for the deposit of nuclear waste. For example, a fracturing fluid having a high density is reportedly used to propagate fractures downward rather than horizontally and waste material is carried by gravity instead of by pumping. Examples are shown in U.S. Pat. Nos. 9,190,181, 9,700,922, and 9,741,460.

There is interest in accessing energy from the Earth in the form of geothermal energy as it may provide a clean and renewable source of energy. Geothermal energy can potentially be accessed by drilling wellbores and fracking, but the systems, methods, and compositions for extracting geothermal energy are necessarily different from those applied in oil and gas extraction and other fracking operations. Geothermal energy is generally accessible at lower (closer to the earth's core) depths and higher pressure and temperature conditions. The extraction of heat energy also differs significantly from the extraction of liquid and gas hydrocarbons in that harvested heat must be conducted to the surface and without excessive loss of heat energy. Thus, while the aim of oil and gas fracking is to create fractures with high permeability for harvesting oil and gas, fractures for geothermal applications need to be thermally conductive for the harvest of heat, which requires two different approaches for handling the fractures created for oil and gas as compared to geothermal applications. Due to these challenges and the high upfront capital expenditures associated with addressing those challenges, geothermal energy extraction is currently viewed as too expensive or inaccessible.

There is a need in the art for alternative systems, methods and compositions that can economically extract geothermal energy. There is also a need for improved systems, methods and compositions that can provide improved control over fracture growth to access geothermal energy.

SUMMARY OF THE INVENTION

The present invention is directed to systems, methods, and compositions for extracting geothermal energy from the Earth.

The present invention is further directed to a system, method, and composition for fracking subterranean formations and fractures to access geothermal energy. The location of geothermal energy is geography dependent, but is generally deeper than the depth needed for oil and gas extraction.

The present invention is further directed to a system, method and composition for extracting geothermal energy, wherein one or more fractures are created to access the areas with higher temperature, and the downward vertical growth of the fracture is controlled by varying the specific gravity of a fluid being pumped into a well during a fracking operation to increase and/or maximize rock surface area connected to the wellbore for improving efficiency of downhole heat exchange in geothermal wells.

In another embodiment of the invention, is a system, method and composition for creating thermally conductive and/or convective fractures to efficiently move heat from depths in the earth deeper than the depth to which the wellbore was drilled.

In one embodiment, this disclosure teaches inventive techniques for creating vertical fractures in a formation, preferably where at least 80% percent of the fracture growth can be controlled to grow either up or down in the formation, with preferred direction of fracture growth being downward towards hotter rock for geothermal applications.

In a further preferred embodiment, at least 85%, 90% or 95% of fracture growth can be controlled to grow either up or down in the formation. In one embodiment, the larger the fracture size results in a higher percentage control of fracture growth in either up or down direction.

In another embodiment, this disclosure also teaches techniques for controlling the fracture's vertical growth direction in real time during a pumping operation through variable control of slurry densities being pumped.

In another embodiment, this disclosure teaches inventive techniques for varying the fracture's ability to conduct heat by use of a proppant particles designed to increase and/or maximize heat transfer from the formation to the wellbore.

In one embodiment according to the invention, the fractures can be packed with proppant particles that can conduct heat significantly better than the formation's ability to conduct heat and convey that heat to the wellbore.

In a preferred embodiment, the proppant comprises a material that has a relatively high thermal conductivity.

In a preferred embodiment, the proppant material creates a thermal conductivity contrast greater than 5.0 where conductivity contrast is equal to the thermal conductivity of the proppant particles divided by the thermal conductivity of the formation being fracked.

In another preferred embodiment, the proppant used in the invention comprises tin, aluminum, graphite, hematite, magnetite, barite, diamond, silver or gold, or a combination thereof. In another example, the proppant comprises materials that are economical to use. For example, the proppant may comprise tin, aluminum, graphite, hematite or barite, or a combination thereof.

In another embodiment, this disclosure teaches inventive techniques for preferentially holding open sections of fractures with proppant that is designed to migrate to the high side or low side or distribute equally along a vertical fracture by adding proppant that sinks, is neutrally buoyant, or is buoyant relative to the slurry in which it is mixed.

In another embodiment is a method to control the vertical growth of one or more fractures in a subterranean formation comprising introducing a first fracturing fluid of a first specific gravity into said formation and into at least one fracture formed therein, introducing a second fracturing fluid of a second specific gravity into said formation and into the at least one fracture formed therein, wherein the specific gravity of the second fracturing fluid is different from the specific gravity of the first fracturing fluid, thereby controlling the growth of the at least one fracture in a vertical direction.

In a preferred embodiment, the specific gravity of the slurry or fluid is varied by adding tin, aluminum, graphite, hematite, magnetite, barite, diamond, silver or gold, or a combination thereof.

In a preferred embodiment, the specific gravity of the slurry or fluid is varied by adding solid particles of tin.

In a preferred embodiment, the specific gravity of the slurry or fluid is varied by adding particles of a material that then settles out of the carrier fluid once placed in the fracture.

In a preferred embodiment, the specific gravity of the slurry or fluid is varied by adding particles of a material which then settles out of the carrier fluid once placed in the fracture, where the material then melts inside the fracture (where temperatures exceed the material's melting point) thus creating a high thermally conductive heat path while further enhancing heat transfer to the wellbore through convective currents in the liquid material. In a preferred embodiment, the material is tin.

In a further preferred embodiment, the specific gravity of the slurry or fluid is varied by increasing and/or decreasing the slurry weight of the slurry or fluid by increasing/decreasing the pounds per gallon of proppant per gallon of carrier fluid.

In another embodiment, the slurry or fluid comprises a material having a specific gravity of at least 2.5 or greater and the material increases the slurry or fluid density to steer the direction and/or rate of growth of vertical subterranean fractures. In a further embodiment, the slurry or fluid comprises a material having a specific gravity of at least 3.0, 3.2, 3.4, 3.6, 3.8, 4.0, 4.2, 4.4, 4.6, 4.8, or 5.0.

In another embodiment, the slurry or fluid comprises a material having a thermal conductivity contrast compared to the formation being fracked of at least 5.0 or greater and the material increases the slurry or fluid density to steer the direction and/or rate of growth of vertical subterranean fractures. In a further embodiment, the slurry or fluid comprises a material having a thermal conductivity contrast of at least 10, 50, 100, 500, or 1000.

In another embodiment, the specific gravity of the slurry or fluid is changed by varying the specific gravity of the carrier fluid used to suspend the proppant during a fracking operation.

In another embodiment, the specific gravity of the slurry or fluid is varied during the original frack design to pump one or more slurry or fluid densities on a predetermined or set schedule to obtain variable growth directions based on the geology of the well.

In another embodiment, zones at variable depths are open to be fracked during a single frack operation, and each zone is fracked by varying the densities with the heavier density slurry(ies) or fluid(s) accessing the deeper zones and the lighter slurry(ies) or fluid(s) accessing shallower formations.

In a further embodiment, surface and/or downhole pressure and temperature information indicating fracture growth rate and direction is used to vary slurry or fluid density to steer fracture growth. In a preferred embodiment, surface and/or downhole pressure and temperature information indicating fracture growth rate and direction is used as input into an automated manifold which automatically varies slurry and/or fluid densities being pumped downhole to steer fracture growth. In another embodiment microseismic monitoring is used to determine direction and extend of fracture growth.

In another embodiment, surface and/or downhole real time seismic information indicating fracture growth rate and direction is used to vary slurry or fluid density to steer fracture growth in the real time. In a further preferred embodiment, surface and/or downhole real time seismic information indicating fracture growth rate and direction is used as input in to an automated manifold which automatically varies slurry and/or fluid densities to steer fracture growth.

In another embodiment, proppants of varying specific gravity are added such that the proppant either sinks, is neutrally buoyant, or is buoyant in the slurry being pumped. In a further preferred embodiment, a mix of proppants of specific gravities is pumped to either evenly distribute proppant vertically within the vertical fracture, or is designed such that either the upper or lower portion of a vertical frack is preferentially held open by proppant.

In another embodiment, batches of heavy and light weight slurries are mixed and then blended together to vary slurry density to steer fracture direction. In a further preferred embodiment, slurry density is varied on the fly in batch blenders and then pumped down hole.

One of the more complex technical issues in geothermal operation is the disposal of the fluids that have contacted downhole formations. These fluids have physicochemical properties not suitable for the terrestrial ecosystems. These fluids may be treated and re-injected/disposed of underground. These operations entail high economic costs since they require the drilling and maintenance of additional wells for disposal, as well as the need for treatment and the pumping of the fluids. An alternative embodiment is shown in FIG. 16, which uses an indirect system to extract heat. This kind of well completion allows the extraction of heat using a heat carrier fluid circulated in a closed loop to harvest heat downhole such that the carrier fluid never contacts the downhole formation. Thus fluids contacting the formation are not circulated, reducing and/or eliminating the environmental and economic impact, such as the required energy for reinjection of contaminated fluids. Corrosion and scaling problems are also avoided. The key disadvantage is the reduction of the heat recovery efficiency [Study of geothermal power generation from a very deep oil well with a wellbore heat exchanger. C. Alimonti*, E. Soldo]. Efficiency of the heat recovery is mostly a function of the low thermal conductivity of the formation.

In one embodiment of the inventions after the well is drilled it is fracked using the disclosed techniques to create thermally conductive fissures. Highly thermal conductive fluid is then placed in the borehole. Closed end casing/liner (the downhole heat exchanger's outer shell) is run and positioned to allow thermal expansion. Tubing is run inside to construct the downhole heat exchanger. This well design allows access to the annulus through the well head to fill up with heat conductive fluid and it enables fracture growth operations during the life of the well. In this embodiment, the closed loop downhole heat exchanger is used to heat various fluids such as water or liquified $CO_2$, which is circulated down hole through the specially designed heat exchanger.

In a preferred embodiment a shaped pipe, e.g., FIG. 10, is run for at least part of the casing that is run in the hole so as to maximize radial surface area, surface area can be increased by approximately 40%, both receiving heat from the formation and maximizing surface area of the internal diameter which then heats the circulated fluid through direct contact.

In another embodiment, the tubing string that is used for circulating fluid downhole to harvest the heat has entry points at various depth, e.g., FIG. 9, to allow modifications to flow paths to better harvest heat for the various heat distribution patterns that can be experienced in downhole geothermal wells.

In a further embodiment the inner tubing may be deployed with strakes, e.g., FIG. 11, which are designed to create circumferential/helical movement of the fluid to increase thermal convection.

With well cost often exceeding half the overall cost of getting a geothermal power plant online, the disclosed techniques provide a significant advantage to the geothermal industry by allowing access to deeper and hotter rocks while using much shallower wells than would otherwise be required.

In another embodiment, the downhole heat exchanger is made out of high thermal conductivity material, for example, an aluminum alloy.

In another embodiment, highly thermal conductive slurry is put into the wellbore prior to running casing with heat exchanger or spotted after to reduce thermal resistance between outer casing and formation.

In another embodiment, highly thermal conductive fractures in the formation can be created prior to running casing or after using non-return valves (cementing valves, sliding sleeves, etc) run with the casing string. Using non-return valves prevents fracture fluid from flowing back and ensures that highly conductive slurry remains locked inside the fracture(s) when the fractures are created after the casing, or outer shell of the downhole heat exchanger, is run.

In another embodiment, fluid is forced in to the fracture network to be heated by imposing an increasing pressure on top of the hydrostatic head. The heated fluid is then flowed back either across a downhole heat exchanger or back to surface by the decrease of the imposed surface pressure.

In another embodiment, fluid is forced in to the fracture network to be heated by imposing and increasing pressure which exceed the fracture propagation and/or fracture initiation pressure of the exposed formation. This extended fracture area that is created then exposes more area for heat harvest in the fracture network.

In another embodiment a downhole heat exchanger is deployed and is used to harvest heat from the heated fluids that are expelled from the fracture network when surface pressure is released.

In another embodiment the annulus between the heat exchanger and the fracture network is left open so that a hydrostatic head exceeding fracture opening pressure can be maintained by the periodic addition of weighted fluid at the wellhead.

In another embodiment the annulus between the heat exchanger and the fracture network is left open so that a hydrostatic head exceeding fracture propagation and/or fracture initiation pressure can be created by the addition of weighted fluid at the wellhead, thus creating increased surface area in the fracture network that is then available for heat harvest. In another embodiment there is no downhole heat exchanger and the heated flowback fluid from the fractures is circulated back to surface for heat harvest.

In another embodiment a turbine is used to harvest energy for flowback fluids from the well.

In another embodiment a turbine is used in lieu of a choke to put back pressure on the downhole fractures to force fluid in to the fracture network.

In another embodiment 2 wells containing Zinc Bromide brine are paired to create a large battery for use in storing power.

BRIEF DESCRIPTION OF THE DRAWINGS

FIG. 3 is a graphical illustration showing how designing a fracking fluid which exceeds the formation's fracture gradient will create a fracture that grows both up and down, with a bias in the down direction.

FIG. 4 is a schematic illustration and description showing how pumping high density slurries greater than the formation fracture gradient followed by a light fluid with a gradient less than the fracture gradient of the formation can develop a gradient inside the fracture which promotes downward fracture growth.

FIG. 11 is an example of screw shaped strakes attached to the outer diameter of the wells tubing to create helical-type flow which will dramatically increases effective contact area and decreases relative vertical fluid velocity.

DETAILED DESCRIPTION

Figure 1:
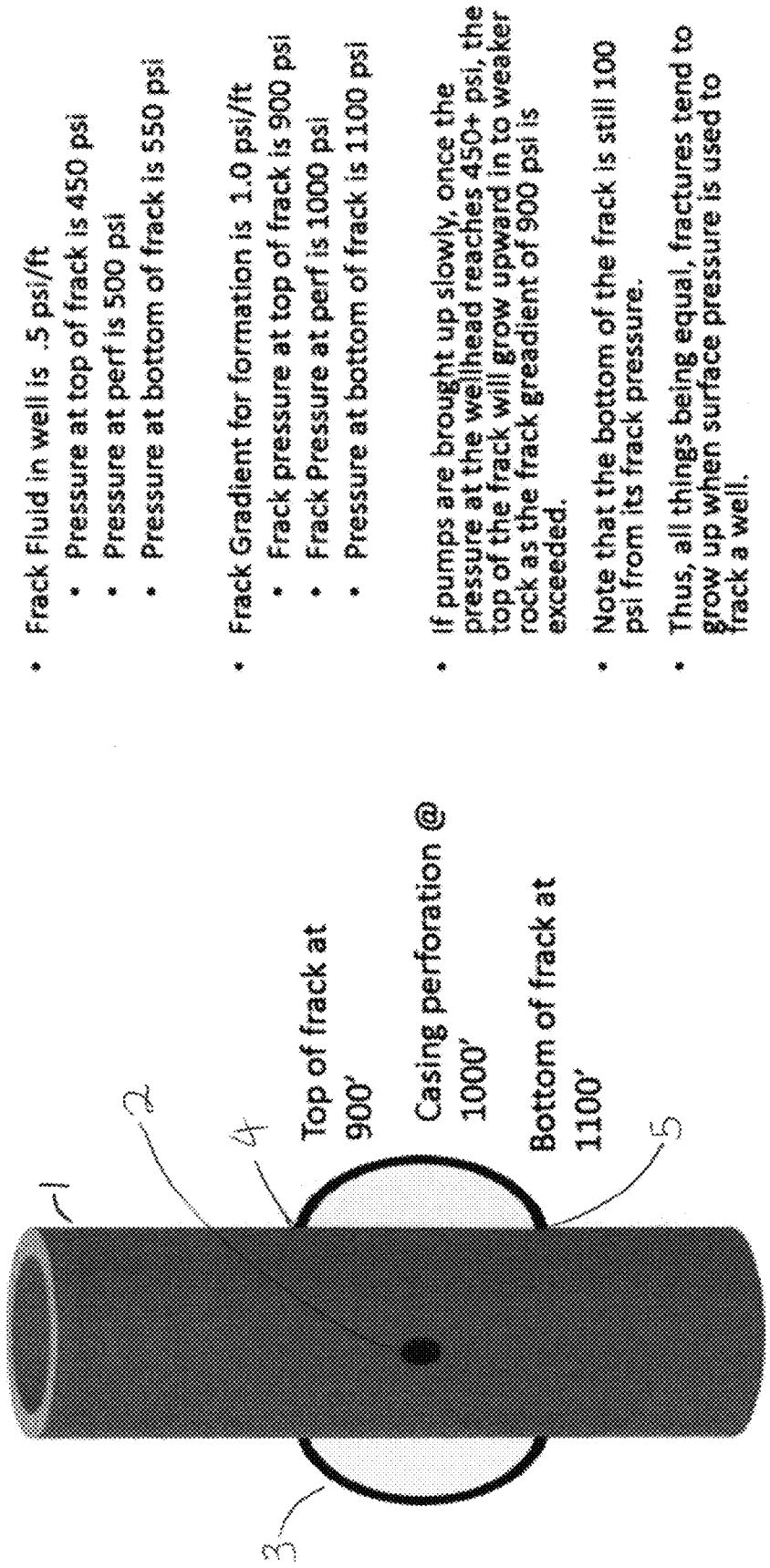
FIG. 1 is a graphical illustration of the operation of a system, where fracking fluids generally have a lower gradient than the formation's fracture gradient, and fractures will have a tendency to grow in an upward direction.

In the drawings and description that follows, certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

The present invention involves a method of controlling fracture grown in the extraction of geothermal energy from an underground formation, comprising (i) introducing a first fracking fluid into an underground formation; (ii) introducing a second fracking fluid into the underground formation; wherein the specific gravity of the second fracking fluid is different from the specific gravity of the first fracturing fluid, thereby controlling the growth of at least one fracture in a downward direction, and wherein the fracking fluid in at least one of steps (i) or (ii) contains proppant particles having a thermal conductivity contrast of at least 5.

The methods of the invention employ particles or proppant particles including particles or proppant particles comprising tin, graphite, aluminum, hematite, bauxite, diamond, gold, silver, or a combination thereof. Preferably the particles or proppant particles comprise an economical material, including tin, graphite, aluminum, hematite, bauxite, or a combination thereof. In a further preferred embodiment, the proppant is tin.

In the method according to the invention, the specific gravity of the second fracturing fluid is varied by increasing and decreasing the pounds per gallon of proppant per gallon of carrier fluid.

In a further preferred embodiment, the particle or proppant has a specific gravity of at least 3.0.

In one embodiment, the specific gravity of the fracking fluid is varied during the original frack design to pump various slurry density to obtain variable growth directions based on the geology encountered when the well is drilled.

In another embodiment, zones at variable depths are open to be fracked during a single frack operation, and where each zone is fracked by varying the densities with the heavier density fluids accessing the deeper zones and the lighter slurries accessing shallower formations by design.

In another embodiment, surface and/or downhole pressure and temperature information indicating fracture growth rate and direction is used to vary slurry density to steer fracture growth in the real time. Surface and/or downhole pressure and temperature information indicating fracture growth rate and direction may be used as input in to an automated manifold which automatically varies slurry densities being pumped downhole to steer fracture growth.

In another embodiment, surface and/or downhole real time seismic information indicating fracture growth rate and direction is used to vary slurry density to steer fracture growth. Surface and/or downhole real time seismic information indicating fracture growth rate and direction may be input to an automated manifold which automatically varies slurry densities to steer fracture growth.

In another embodiment, particles or proppants of varying specific gravity are used such that the proppant either sinks, is neutrally buoyant, or floats relative to the various density fluids being pumped during the fracture operation.

As is shown in FIG. 1, current fracking practices, where fracking fluids almost always have a lower gradient than the formation's fracture gradient, fractures will have a tendency to grow up. This tendency to grow up also manifests itself in a commonly heard complaint in the oilfield that in vertical wells, most frack fluid pumped in a well which is perforated in multiple zones goes in to the shallowest zone perfed. From FIG. 1, the upper set of perfs will take most of a frack fluid when multiple zones are open, as the weakest zone will tend to be the shallowest zone and pressures will have difficulty reaching the fracture pressure for the deeper zones as the shallow zones takes frack fluid and keeps surface pressure lower than that needed to open deeper zones.

For example, in FIG. 1, imagine a perfect penny shaped fracture 3 exists around a casing perforation 2 in a well 1. Where the frack fluid in the well is 0.5 psi/ft; the pressure at the top of the frack 4 is 450 psi; the pressure at the perforation 2 is 500 psi; and the pressure at the bottom of the frack 5 is 550 psi. Where the frack gradient for the formation is 1.0 psi/ft; the frack pressure at the top of the frack 4 is 900 psi; the frack pressure at the perforation 2 is 1000 psi; and the pressure at the bottom of the frack 5 is 1100 psi. If pumps are brought up slowly, once the pressure at the wellhead reaches 450+ psi, the top of the frack will grow upward into weaker rock as the frack gradient of 900 psi is exceeded. Note that the bottom of the frack is still 100 psi from its frack pressure. Thus, all things being equal, fractures tend to grow up when surface pressure is used to frack a well.

Figure 2:
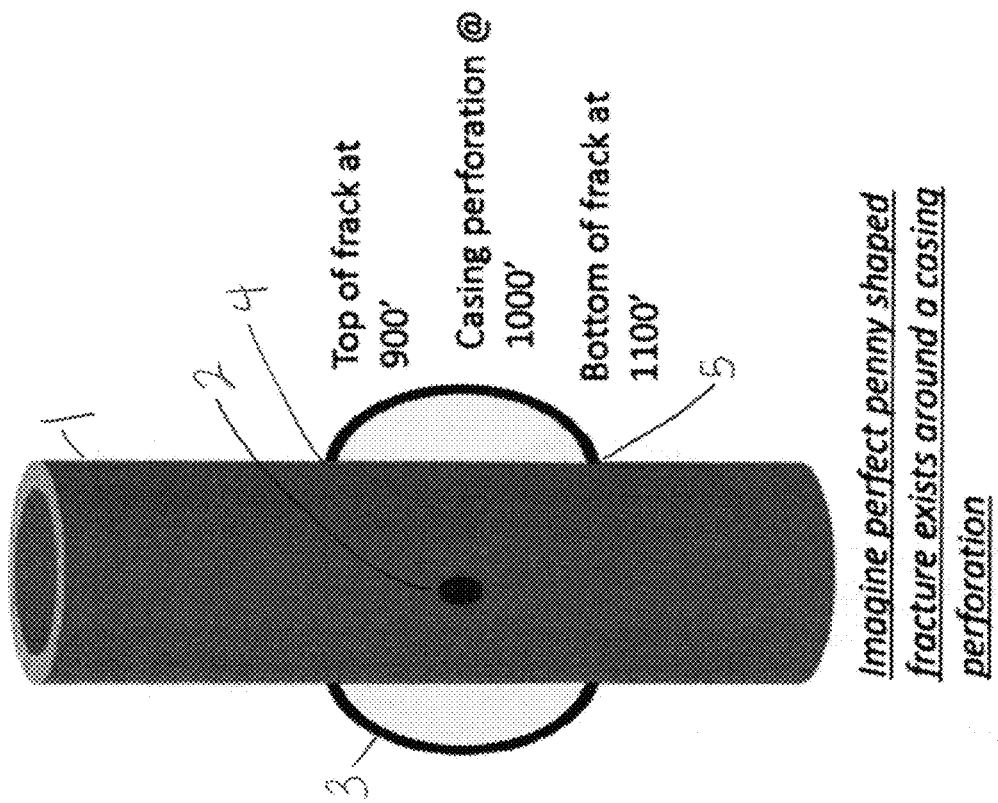
FIG. 2 is a graphical illustration showing how using a fracking fluid that has a gradient equal to the formation's fracture gradient can create a symmetrical penny shaped frack in an ideal formation where the fluid's density can be maintained to exactly match that of the formations fracture gradient.

In order to correct this bias, FIG. 2 shows how using a frack fluid that has a gradient equal to the formation's fracture gradient can create a symmetrical penny shaped frack in an ideal formation where the fluid's density can be maintained to exactly match that of the formations fracture gradient.

For example, in FIG. 2, imagine a perfect penny shaped fracture 3 exists around a casing perforation 2 in a well 1. Where the frack fluid in the well is 1.0 psi/ft; the pressure at the top of the frack 4 is 900 psi; the pressure at the perforation 2 is 1000 psi; and the pressure at the bottom of the frack 5 is 1100 psi. Where the frack gradient for the formation is 1.0 psi/ft; the frack pressure at the top of the frack 4 is 900 psi; the frack pressure at the perforation 2 is 1000 psi; and the pressure at the bottom of the frack 5 is 1100 psi. If pumps exert any pressure at the surface, the fracture will grow equally in all directions and grow symmetrically. Thus, the frack will grow in all directions with a self-correcting bias as the symmetry gets out of balance. Thus, in theory and with all things being equal, fracture fluids can be designed which will steer the frack in a true penny shaped fracture if a truly homogeneous formation is ever found in the field by keeping the frack fluid density exactly equal to the frack gradient.

In FIG. 3, it is shown how designing a frack fluid which exceeds the formation's fracture gradient will create a fracture that grows both up and down, with a bias in the down direction.

In FIG. 4, it is shown how pumping high density slurries greater than the formation fracture gradient followed by a light fluid with a gradient less than the fracture gradient of the formation can develop a gradient inside the fracture which promotes downward fracture growth.

This invention involves designing low cost (i.e., at costs which will preferably not increase current frack costs by more than 10% for the frack company) frack fluids which can systematically be used to steer the direction in which fractures grow in the vertical direction.

For example, in FIG. 3, imagine a perfect penny shaped fracture 3 exists around a casing perforation 2 in a well 1. Where the frack fluid in the well is 1.5 psi/ft; the pressure at the top of the frack 4 is 1350 psi; the pressure at the perforation 2 is 1500 psi; and the pressure at the bottom of the frack 5 is 1650 psi. Where the frack gradient for the formation is 1.0 psi/ft; the frack pressure at the top of the frack 4 is 900 psi; the frack pressure at the perforation 2 is 1000 psi; and the pressure at the bottom of the frack 5 is 1100 psi. If pumps simply keep the hole full with the 1.5 psi/ft fluid, the pressure at the top and the bottom of the frack will be 450 and 550 psi over the frack gradient (respectively). Thus, the frack will grow in all directions in 2 dimensions with a bias toward downward growth. Thus, all things being equal, fracture fluids can be designed which will steer the frack to have a bias toward downward growth by having the gradient of the fluid exceed the rock's fracture gradient.

In FIG. 4, also imagine a perfect penny shaped fracture 3 exists around a casing perforation 2 in a well 1. Where the frack fluid in the wellbore is 0.5 psi/ft, the pressure at the perforation 2 is 500 psi. Where the frack fluid displaced into the fracture is 1.5 psi/ft; the frack pressure at the top of the frack 4 is 350 psi; the frack pressure at the perforation 2 is 500 psi; and the pressure at the bottom of the frack 5 is 650 psi. Where the frack gradient of the formation is 1.0 psi/ft, the frack pressure at the top of the frack 4 is 900 psi, the frack pressure at the perforation 2 is 1000 psi, and the pressure at the bottom of the frack 5 is 1100 psi. When the light weight 0.5 psi/ft frack fluid has reached the perforation 2 while displacing the 1.5 psi/ft frack fluid, the surface pressure will be 450 psi. Note that the pressure to frack the bottom of the frack is equaled at 450 psi. While we are still 100 psi short of growing the fracture up. Thus, the frack will grow strictly down until a balance is reached in the fracture of low gradient 0.5 psi/ft fluid and 1.5 psi/ft fluid. Thus, all things being equal, fractures tend to grow down when the fluid inside the fracture is dominated by a fluid which is greater than the frack gradient.

This invention involves the design of fracking fluids that can dramatically improve placement of fractures. This has many implications including ensuring fractures do not grow up into potable and useable water zones and it ensures that fractures stay in zones where hydrocarbons are targeted rather than growing out of zone and wasting frack resources.

In the simplest form, a fracturing fluid can be designed using only a high specific gravity (SG) material in water/oil or other fluid with a particle size distribution designed to control settling rates to achieve desired results. Two such materials are barite and hematite, with Specific Gravities (SG) of 4.2 and 5.4, respectively, both of which have much higher thermal conductivities than most any formation they will be pumped into.

In FIG. 3, for illustration, an extreme case was used for ease of mental calculations. However, it is still very practical and achievable. The 1.5 psi/ft fluid equals a SG of 3.46. To mix a water and barite slurry of a SG of 3.46 one would need to mix 77% by volume of barite with water. However, a similar SG slurry of 3.46 can be mixed with hematite using 56% by volume hematite. Even without friction reducer additive, such a slurry will be pumpable as a proppant to control frack growth direction. Once pumped, the fractures will predominately grow deeper than the fracture initiation point. Further, once pumping stops, the high SG proppant particles will settle toward the bottom of the fracture, creating a thermally conductive bed which will allow the free flow of heat back to the wellbore.

In most cases the design engineer will likely chose to design a slurry which is only 0.1 or 0.2 pounds per gallon heavier than the frack initiation or fracture propagation gradient. Given that frack gradients generally range between 0.6 and 1.0 psi/ft once a well gets below 5000' depth, barite and/or hematite and water only slurries will be very pumpable with the main design parameter required to settle on once the gradient is chosen being the particle size to be pumped. Both barite and hematite have industry specified (API) particle sizes for normal drilling operations and much smaller particle sizes for wells where settling is an issue. For frack designs where the heavy particles need to be carried deep into the fracture network, the slow settling small product may be desirable. Where quicker settling of the heavy particle is desirable, the larger and standard API certified products will work well.

In extreme case, small particles of very high thermal conductivity (with thermal conductivity contrasts of 1000 or higher) may be pumped where thermal efficiency is paramount and cost is not an issue. In such cases, technically ideal particles might include silver, gold, or diamond dust.

In a less extreme case, tin could be the particles pumped. Technically this is an ideal proppant for geothermal as it can be pumped as a solid and it will liquify as it heats up beyond 235° C. As a liquid it will very effectively transport heat to the well through both thermal conductivity and convection. Tin, with a specific gravity above 6, has a low melting point (around 235 C). In a liquid state, tin would convey a pressure gradient in the fracture high enough that the fracture will not close while transferring heat to the wellbore through a high thermal conductivity contrast and through convection as the hottest tin rises toward the wellbore to heat the well and the coolest tin migrate down deeper toward the earth's center where it is heated. A material similar to tin for such use is selenium.

More complex slurries can also be generated mixing the heavy solid particles with the aluminum/sand/ceramic/other proppants and water or other carrier fluids to achieve the desired SG and thermal conductivity for steering the well either up or down while still providing a good thermal conductivity contrast between the formation and the particle filled fracture. Thus the design engineer will have the option of 1) pumping intermittent slugs of heavy frack fluids between frack fluids with lower specific gravity particle proppants with acceptable thermal conductivity and densities; 2) mix high SG material directly with lower SG proppants; 3) have 2 slurries, one weighted with a high SG particles with good thermal conductivity such as barite and/or hematite and a frack fluid with lower SG proppants such as aluminum or sand as needed by the design, where the two slurries can be mixed to deliver varied slurry densities downhole based on design and/or field data requirements.

During fracture initiation, the difference between the fracture pressure required to frack up vs down will be minimal. However, as the fracture dimensions grow in the vertical direction, the control over the fracture's direction of growth will increase using this technique. It is estimated on a typical size fracture on a vertical well, directional control in the vertical direction will be 80% or better toward the end of the job and that fracture growth direction, either the up or down, will be easily controlled.

Figure 8:
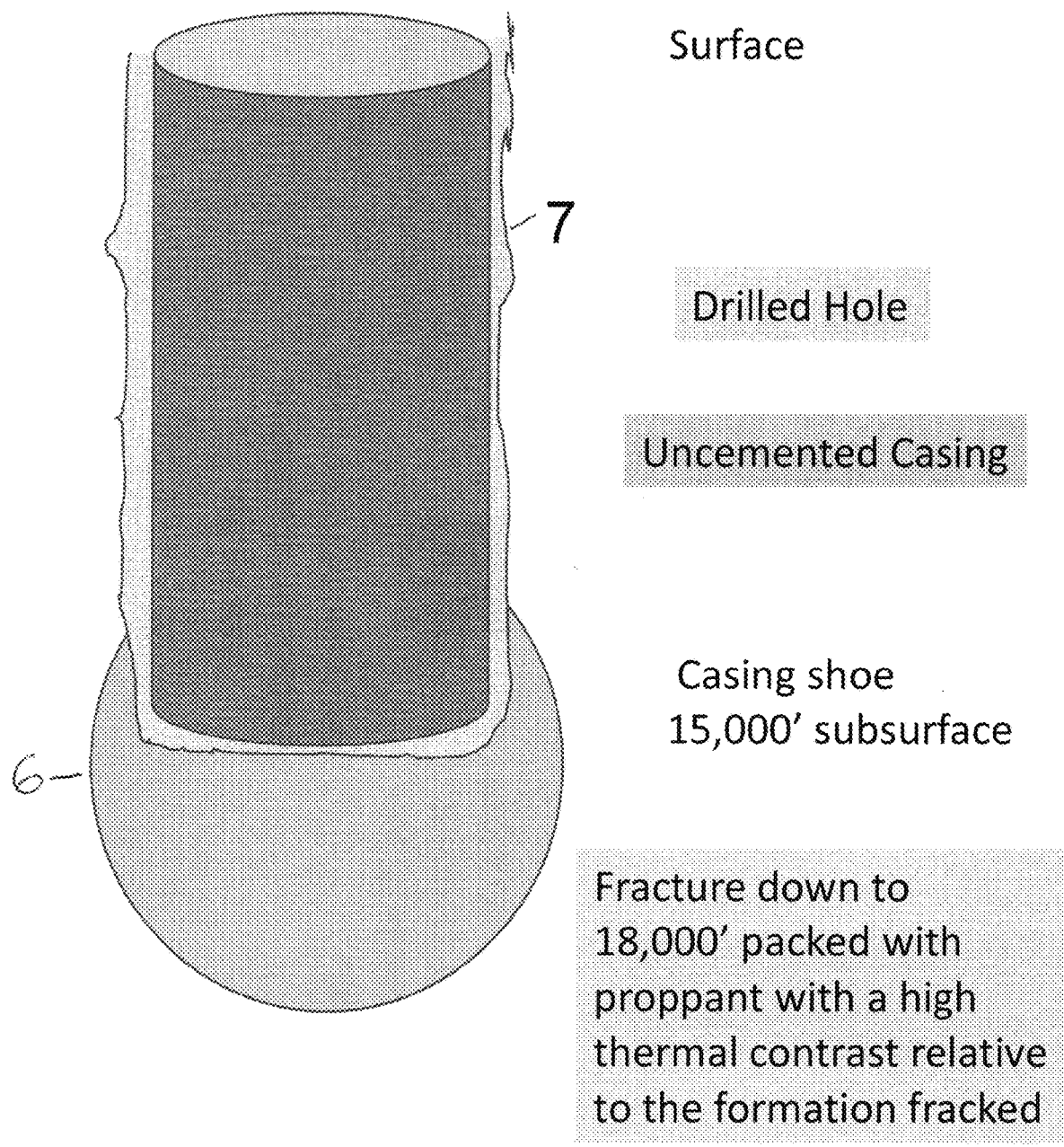
FIG. 8 is a simplified graphical example of how a frack down operation targeting deep hot rock for geothermal power works.

In FIG. 8, a simplified example is presented to demonstrate how the frack down operation will work sequentially. This example demonstrates how a heavy fluid can be pumped to initiate a fracture 6 at the bottom of the drilled hole 7 and then continue the growth of the fracture in the predominantly downward direction toward hotter and hotter rock. The fracture created can then be packed with high thermally conductive proppant or a conductive fluid. The fracture might only be partially filled and the fractures could be used to inject with high pressure fluid, allowed to heat, and then flowed back to surface.

Figure 9:
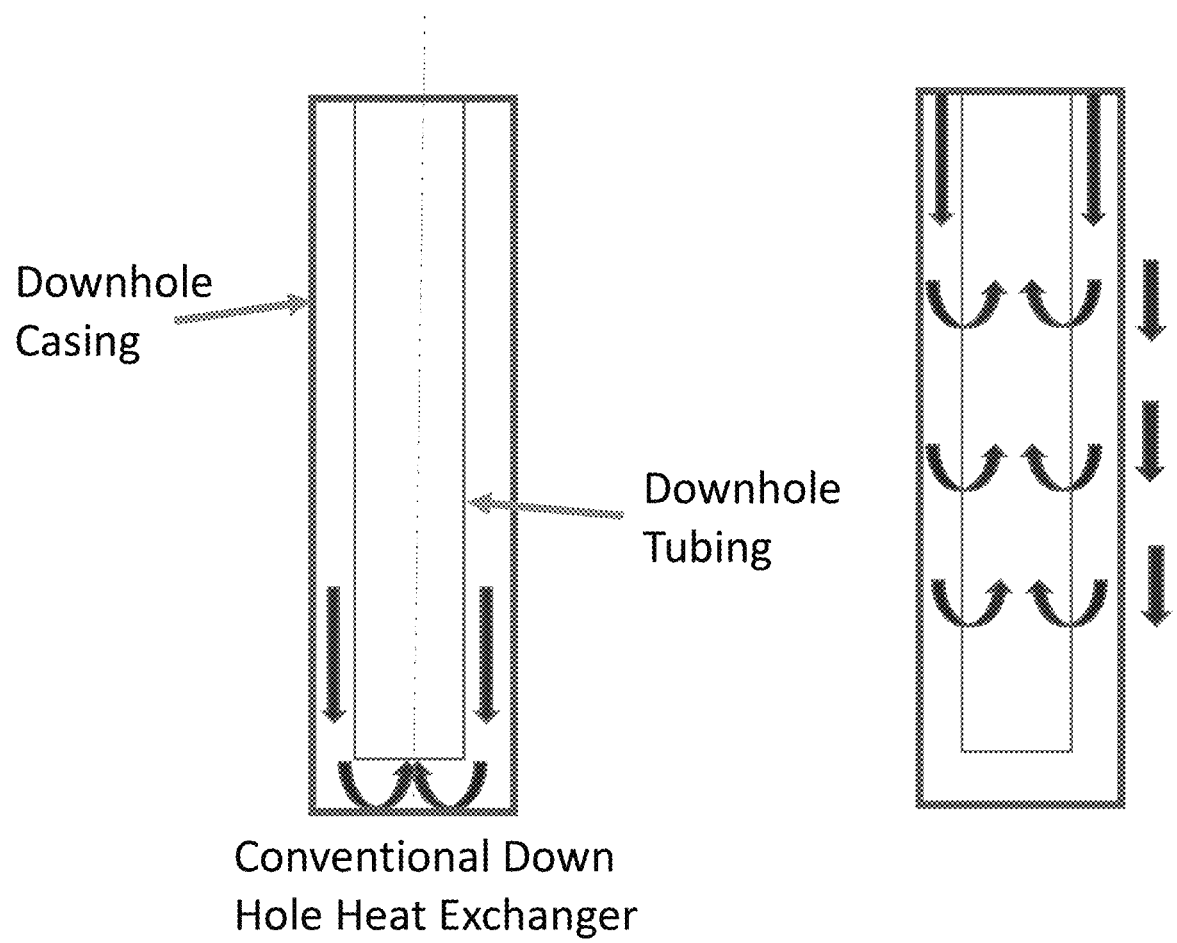
FIG. 9 is a comparison of a conventional downhole heat exchanger and a split stream downhole heat exchanger.
Figure 10:
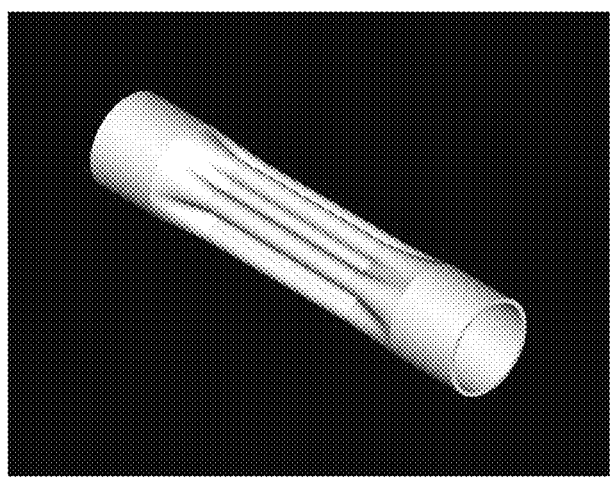
FIG. 10 is an example of a shaped casing designed to maximize the casing's surface area which can run in to a well with a certain hole diameter so as to improve/optimize heat harvesting from the downhole heat sources thermally coupled to the wellbore.
Figure 12:
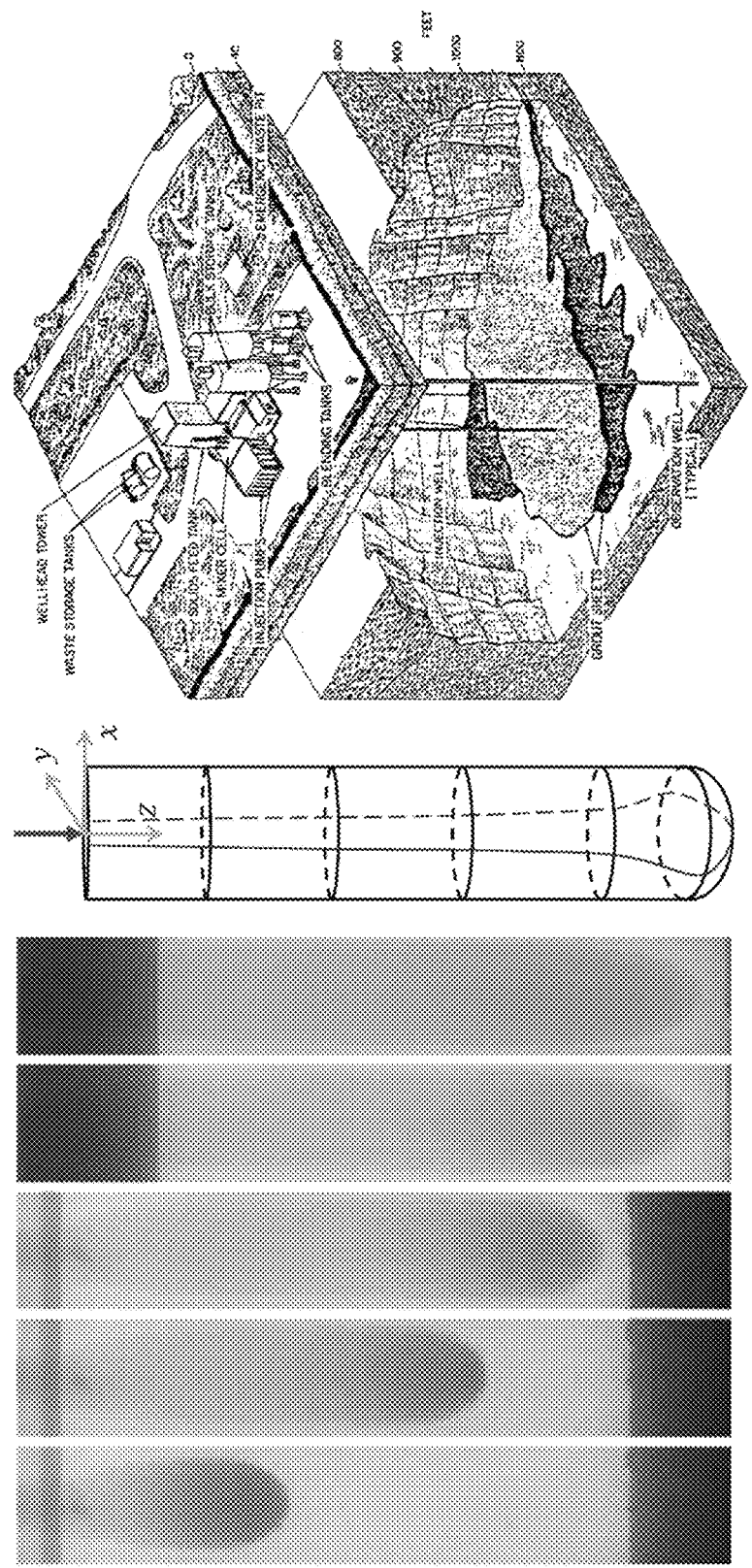
FIG. 12 is a figure that demonstrates a technology developed for the disposal of nuclear waste.

In FIGS. 9 through 11 are an overview of a downhole heat exchanger and its main components. Downhole heat exchangers are key components for harvesting heat for geothermal wells. FIG. 9 shows a split flow downhole heat exchanger. Multiple return holes create split flow and reduce effective annular velocity rate, thus improving heat exchange.

FIG. 10 shows a shape pipe that increases the surface area of the downhole heat exchanger. The diameter of the casing hole is limited by the hole size that was drilled. Using shaped casing joints allows an increase preferably up to 40% contact area between the casing and formation if the annulus between the casing and formation is filled by highly conductive fluid that may be settable or not. If troughs are spiraled, contact area is increased and causes spiral/helical movement of the fluid and makes convection heat transfer more efficient.

FIG. 11 shows a method for creating helical flow for a downhole heat exchanger (strakes). The main issue for closed loop geothermal systems is low contact area between working fluid and the casing. With relatively high circulation rates heat exchange is dominated by convective terms (versus conductive). Convective term is proportional to axial (Vertical) fluid velocity in DHE lengths is limited by well depth. Manufacturing heat exchanger in the form of a screw and arranging helical-type flow dramatically increases effective contact area and decreases relative vertical fluid velocity. A 3D manufacturing process can be used to manufacture the downhole heat exchanger.

Figure 5:
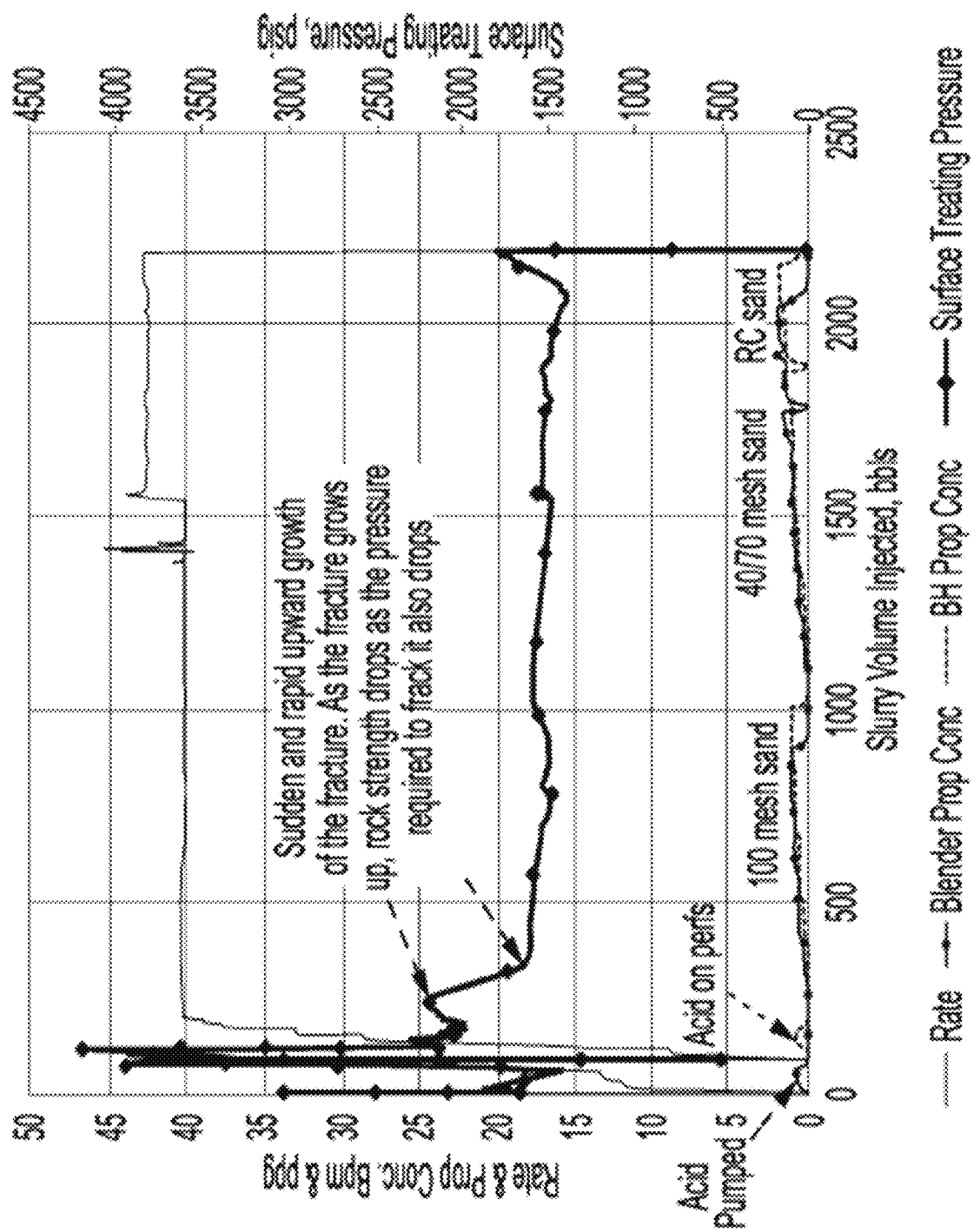
FIG. 5 is a graphical example of upward frack growth.
Figure 6:
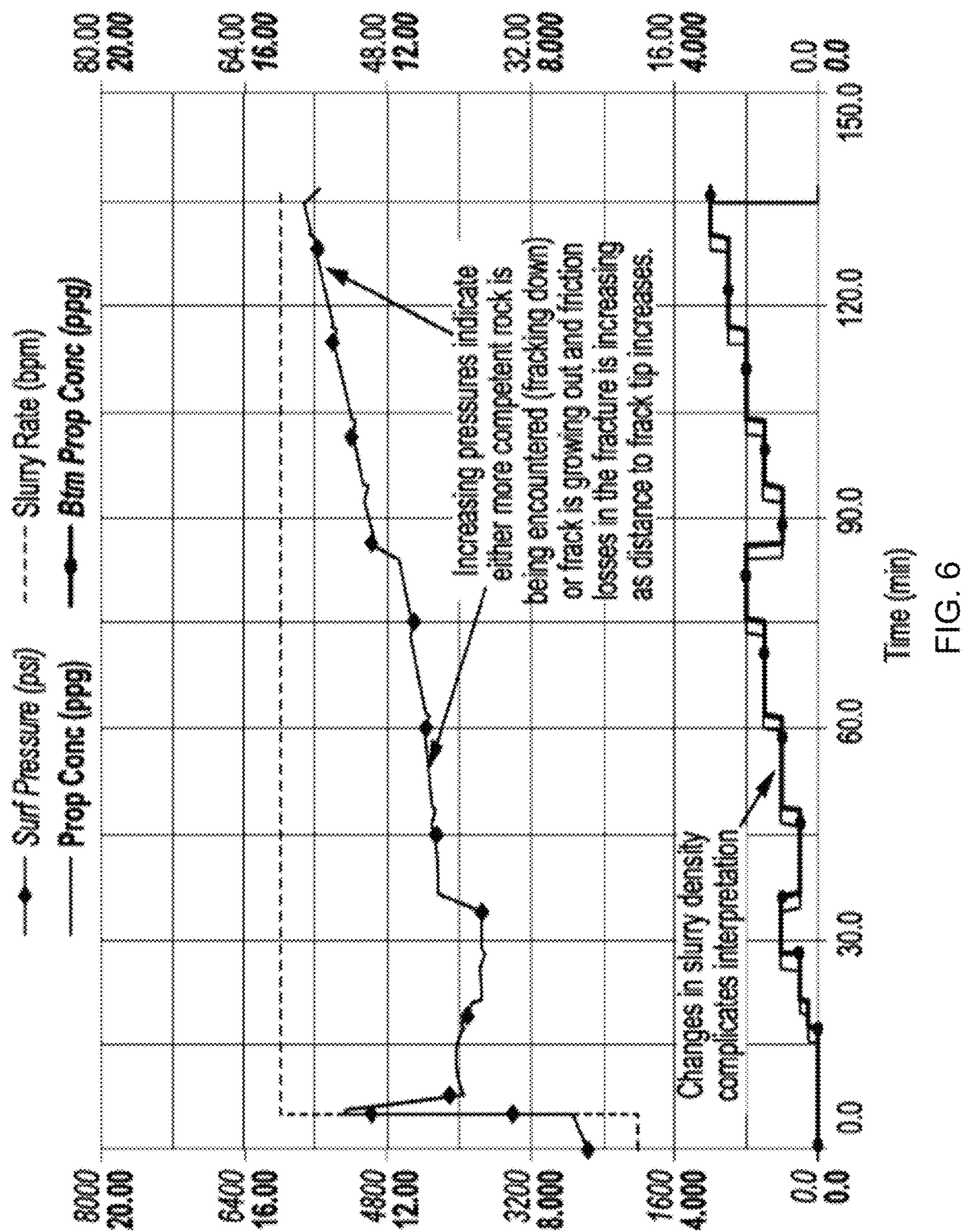
FIG. 6 is a graphical example of downward and horizontal frack growth.

In FIG. 5, the pump pressure dropped unexpectedly during an operation even though injection rate and slurry densities remained constant. This is a clear example of a fracture breaking out of containment barriers and growing upwards into an overlying formation. After breaking through the containment barrier, the fracture continued growing up in to ever weaker rock until it finally encountered a new containment barrier. This invention allows frack crews to pump a heavy fluid that is either pre-mixed and ready to pump or one which can be mixed on the fly to break the upward growth and steer the fracture growth downward. Once the concentration of weighted slurry in the fracture is great enough that indications of downward and outward growth are seen as shown in FIG. 6, pumping of lighter weight proppant slurries can resume. Or, pumping can be stopped, allowing the proppant in the fracture to settle to the bottom of the fracture so that the fracture tip bridges off, such that the when pumping is initiated again, a new fracture branches off in a different direction from the original.

Computer control programs and computer controlled pressure manifolds already developed for Managed Pressure Drilling can be easily adapted to monitor real time pressure responses during a frack job and adjust slurry density and injection rates to steer fractures in the up or down directions in real time. For example, pits of pre-mixed slurries of light and a heavy weight proppant can be tied in to an automated manifold. As the control program sees pressure responses indicating unwanted upward growth, the manifold can automatically increase the density of the slurry going downhole. Similarly if unwanted downward growth is seen by the program, it can automatically adjust to pump a lighter slurry.

Figure 13:
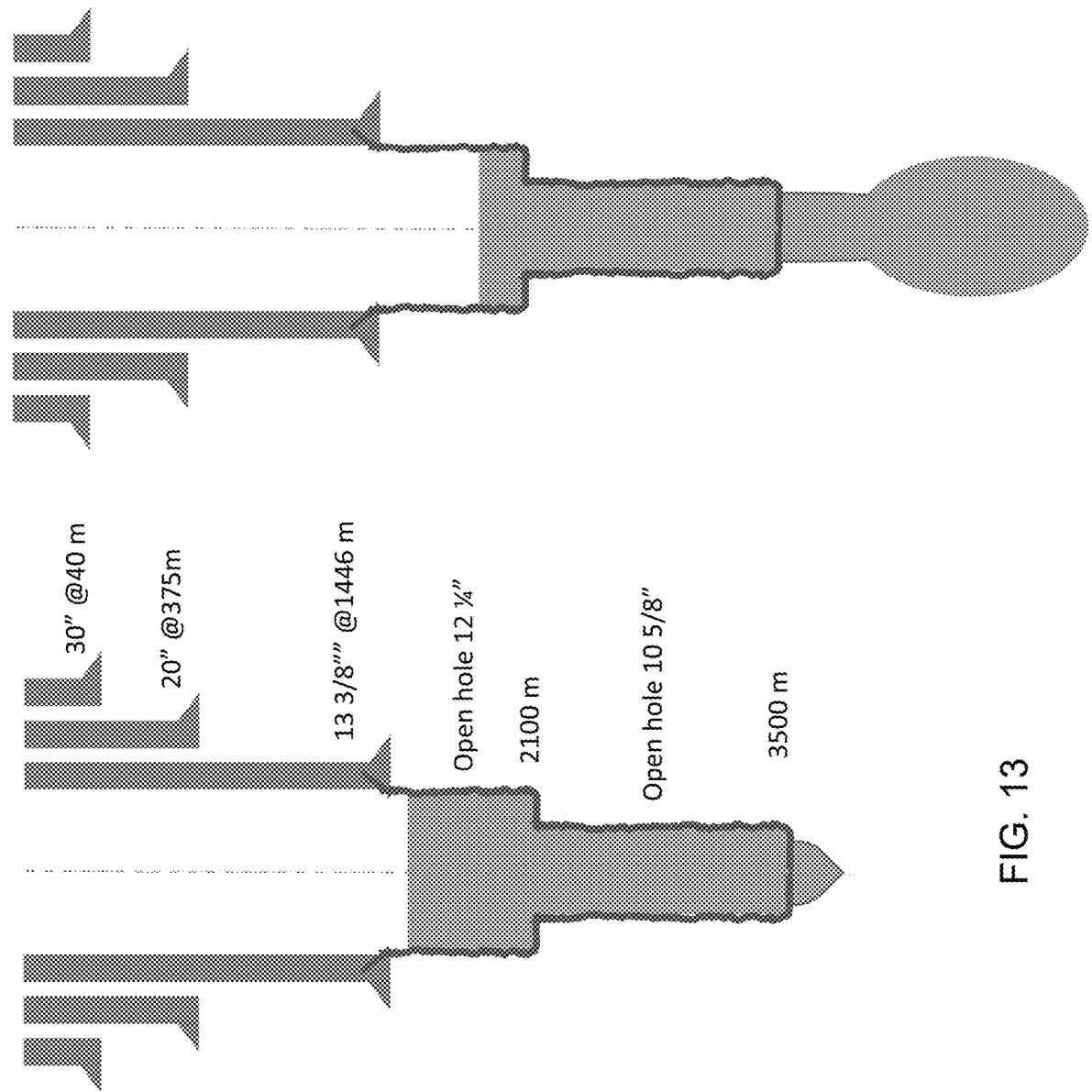
FIG. 13 is a figure depicting a downward frack executed without casing in the hole.

FIG. 13 is a depiction of a conductive fissure. As the fracture propagates downward as fluid drains from the well, the fracture is packed with thermally conductive material.

Figure 14:
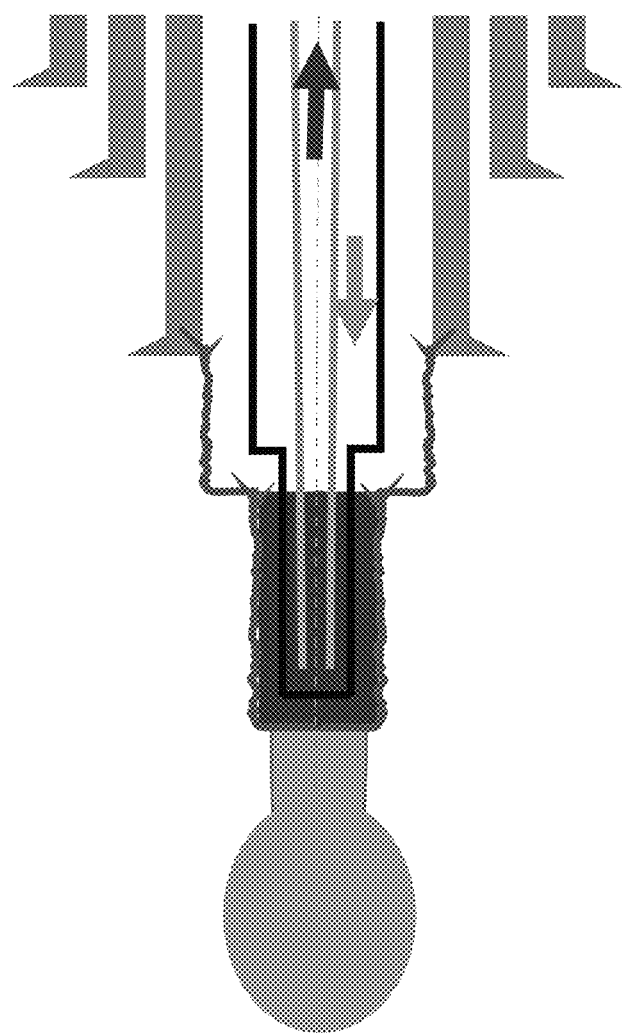
FIG. 14 is a figure depicting how the well fractured in FIG. 13 is cased with a downhole heat exchange system deployed for heat harvesting.

FIG. 14 is a closed loop system with a downhole heat exchanger. The hole is filled for 2000' with a thermally conductive fluid which will efficiently distribute heat through convection from the fissures and wellbore across the bottom 2000' of our casing string. After the convection fluid is spotted, a tapered string is run with 8⅝" casing on the bottom and 9⅝" casing on top inside of which we will run 5.5" thermally insulated casing. The casing not cemented and is set 60' off bottom which will allow the casing to grow down due to thermal expansion. As an alternate embodiment the bottom 2000' can be filled with a tightly packed bed of thermally conductive material which will efficiently distribute heat to the heat exchanger. This bed can be created by pumping the conductive material as a slurry and then allowing the conductive material to settle after pumping in suspended.

Figure 15:
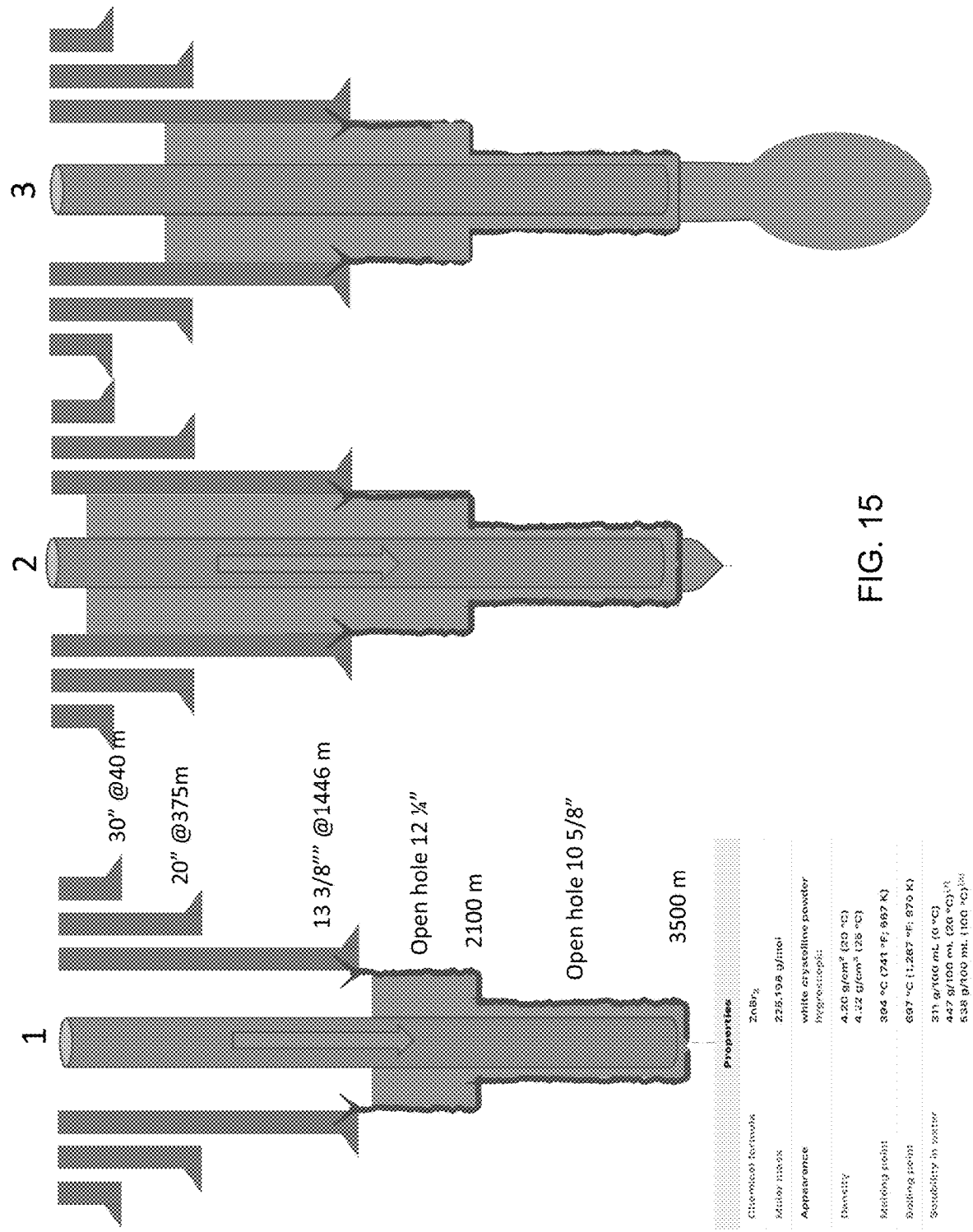
FIG. 15 is a figure depicting a preferred embodiment of the invention with conductive fissures.

In FIG. 15, a preferred embodiment is shown with conductive fissures. The casing and hole are filled with a Zinc Bromide brine mixed to a Specific Gravity that will give a downhole pressure above fracture initiation pressure at the bottom of the hole. If the Zinc Bromide brine is saturated and is still not above the formation fracture gradient, ZnBr salt, barite, hematite, etc., can be added as a weighting agent.

Once the hydrostatic height of the Zinc Bromide brine exceeds the fracture initiation pressure at the bottom of the hole, a predominantly downward fracture will begin to grow. The fracture predominately propagates downward as fluid drains from the well and the brine reaches a height below which fractures do not continue to propagate. The fracture(s) is left filled with thermally conductive Zinc Bromide brine which will through thermal conductivity and convection, convey heat to the downhole heat exchanger.

Figure 16:
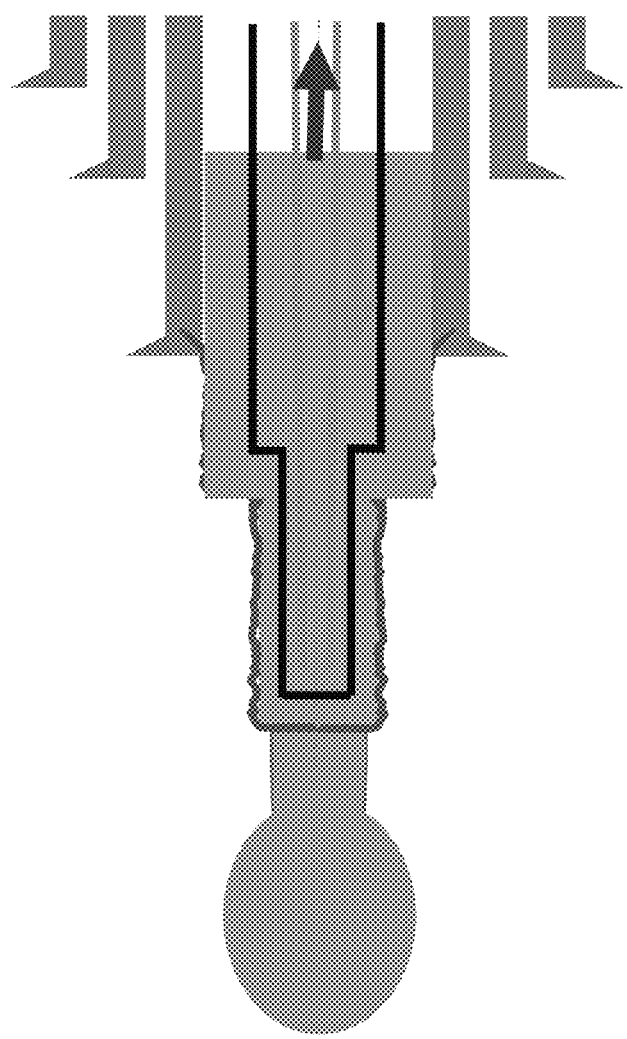
FIG. 16 is a figure depicting a preferred embodiment of the invention as a closed loop system with a downhole heat exchanger.

In FIG. 16, a closed loop system with a downhole heat exchanger is presented. In this embodiment, the hole is filled to a height where the zinc bromide brine's hydrostatic head exceeds fracture opening pressure for the fractures. The brine will then convey heat to the downhole heat exchanger (8⅝" by 9⅝" casing) through thermal conductivity and convections. The brine will efficiently distribute heat through convection from the fissures and wellbore up through the casing string.

In one embodiment the brine is fracked prior to running the downhole heat exchanger. In the shown example a tapered string is run with 8⅝" casing on the bottom and 9⅝" casing on top inside of which we will run 5.5" thermally insulated casing. In an alternate embodiment the 8⅝" by 9⅝" casing is run prior to fracking with the ZnBr brine, then the fracking and displacement occurs, followed by the running of the 5.5" vacuum insulated tubing. The heat will be harvested by pumping a fluid or supercritical fluid, such as water or $CO_2$ down the 9⅝" by 5.5" annulus then back up through the 5.5" vacuum insulated tubing.

In a preferred embodiment the 8⅝" by 9⅝" casing is shaped pipe as shown in FIG. 10 from 60' off the bottom of the open hole to the top of the ZnBr brine.

As the casing is not cemented, the casing is set 60' off bottom which will allow the casing to grow down due to thermal expansion.

During operations, more ZnBr brine can be added to compensate for any fluid that leaks off to the formation or is otherwise lost. ZnBr can be added at anytime during the wellbore's life to extend existing fractures and create new ones in order to expose new heat sources as the old exposed formation surface area becomes cooler.

Figure 17:
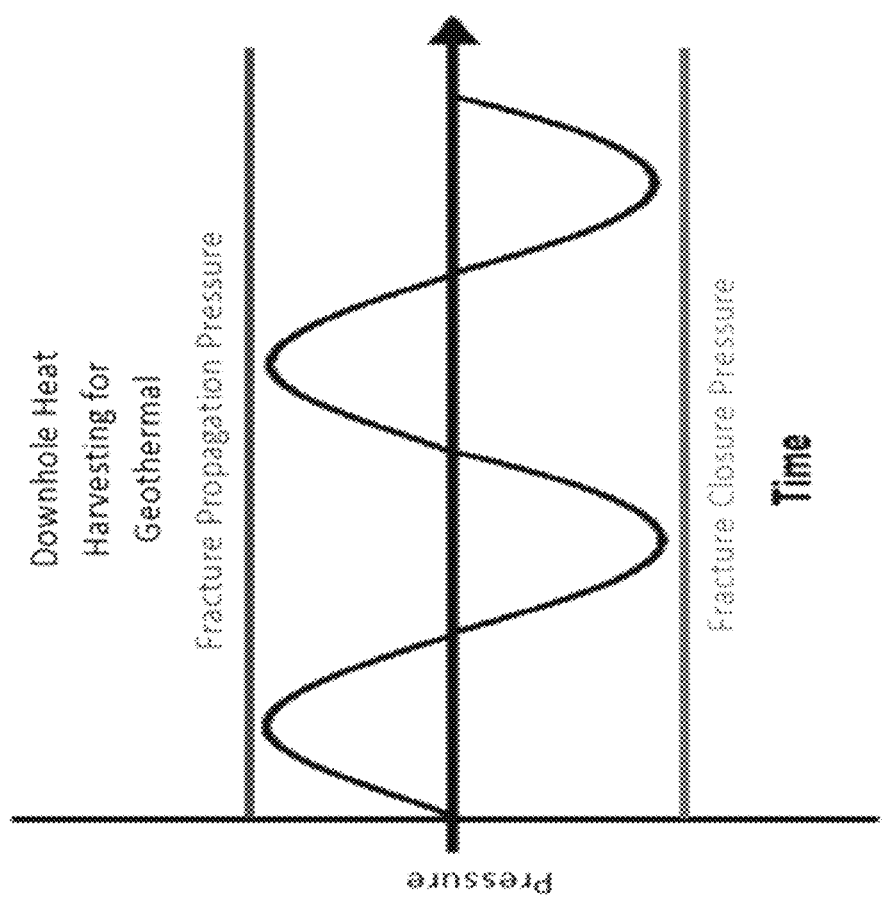
FIG. 17 is a figure depicting a downhole geothermal fluid heat harvesting process for a fractured downhole formation where surface pressure on top of a hydrostatic head is varied in order to inject or expel fluid from the fracture network.

FIG. 17 shows an embodiment where a surface pressure is exerted on the hydrostatic head in contact with the fracture network in the formation. In this embodiment, the pressure exerted on the hydrostatic head is varied such that force exerted on the fractures always remains near or above fracture opening pressure but below the pressure required to propagate the existing fracture network or grow new fractures. This alternating pressure causes the fracture network to "breath" such that as the pressure on top of the hydrostatic head is increasing, fluid is injected in to the fracture network. Conversely, as the pressure is reduced, the fracture network closes and expels fluid. The fluid injected into the fracture network passes between the walls of the heated rock's fracture faces and thus is heated. The fluid that is then expelled is hotter than the fluid was prior to entering the fracture network. This "breathing" of fluid will combine with both thermal and convective heat transfer to help optimize heat harvesting from the fracture network.

In FIG. 17, during the downhole heat harvesting pressure cycle, as the pressure increases, the fracture width increases as shown in FIG. 2. As the fracture width increases, water, other fluid, or slurry enters into the fracture. The water inside the fractures is heated by the hot walls of the downhole formation. During the decreasing pressure portion of the cycle, the heated water is then expelled from the fractures and into the wellbore. The cycles per second, hours or even days will be a function of the heat of the formation, the size of the fracture network, and the heat required by the system for power generation at any given time.

Figure 18:
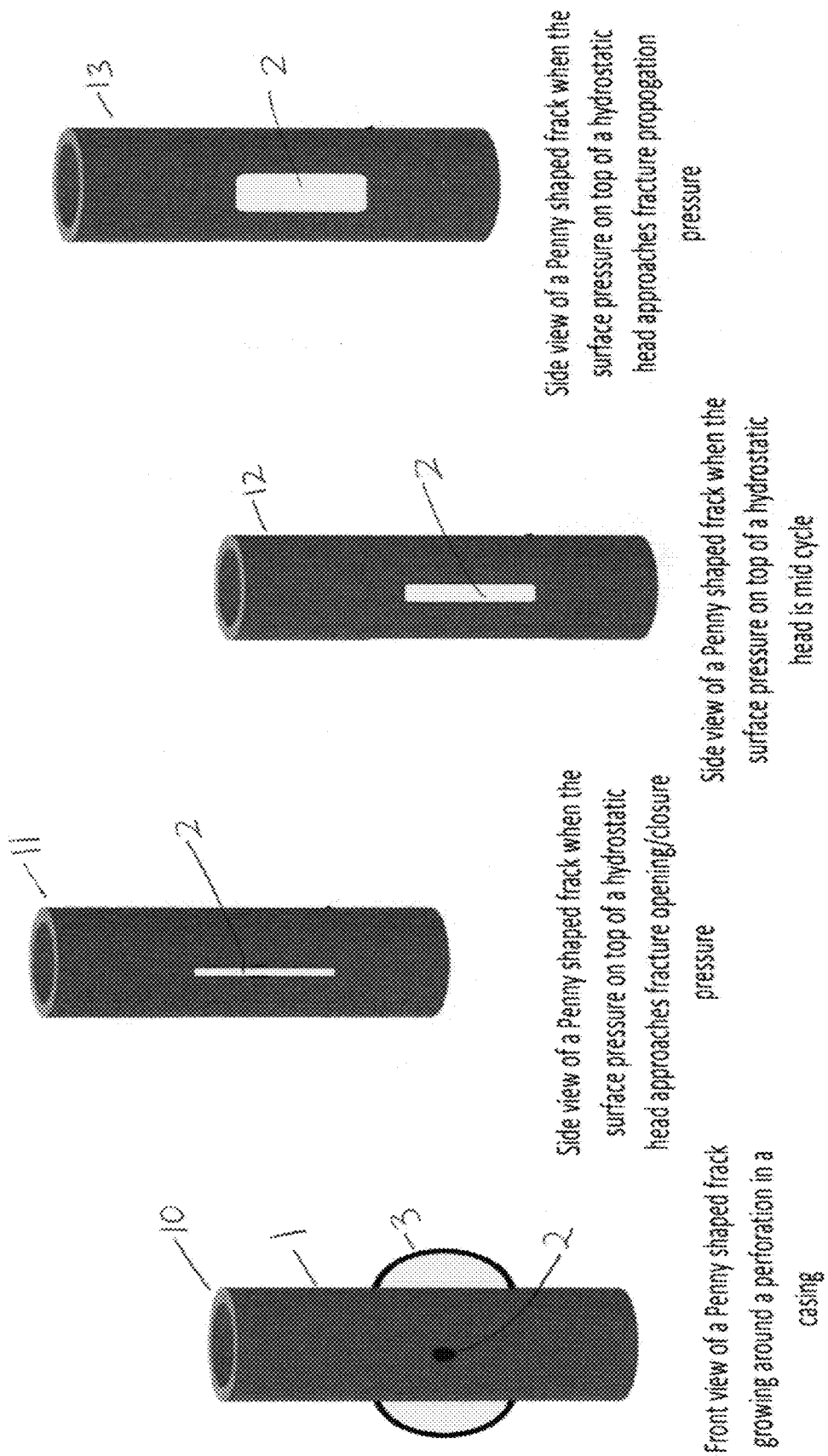
FIG. 18 is a figure depicting conceptual views of fractures at different pressures during heating harvesting cycle.
Figure 19:
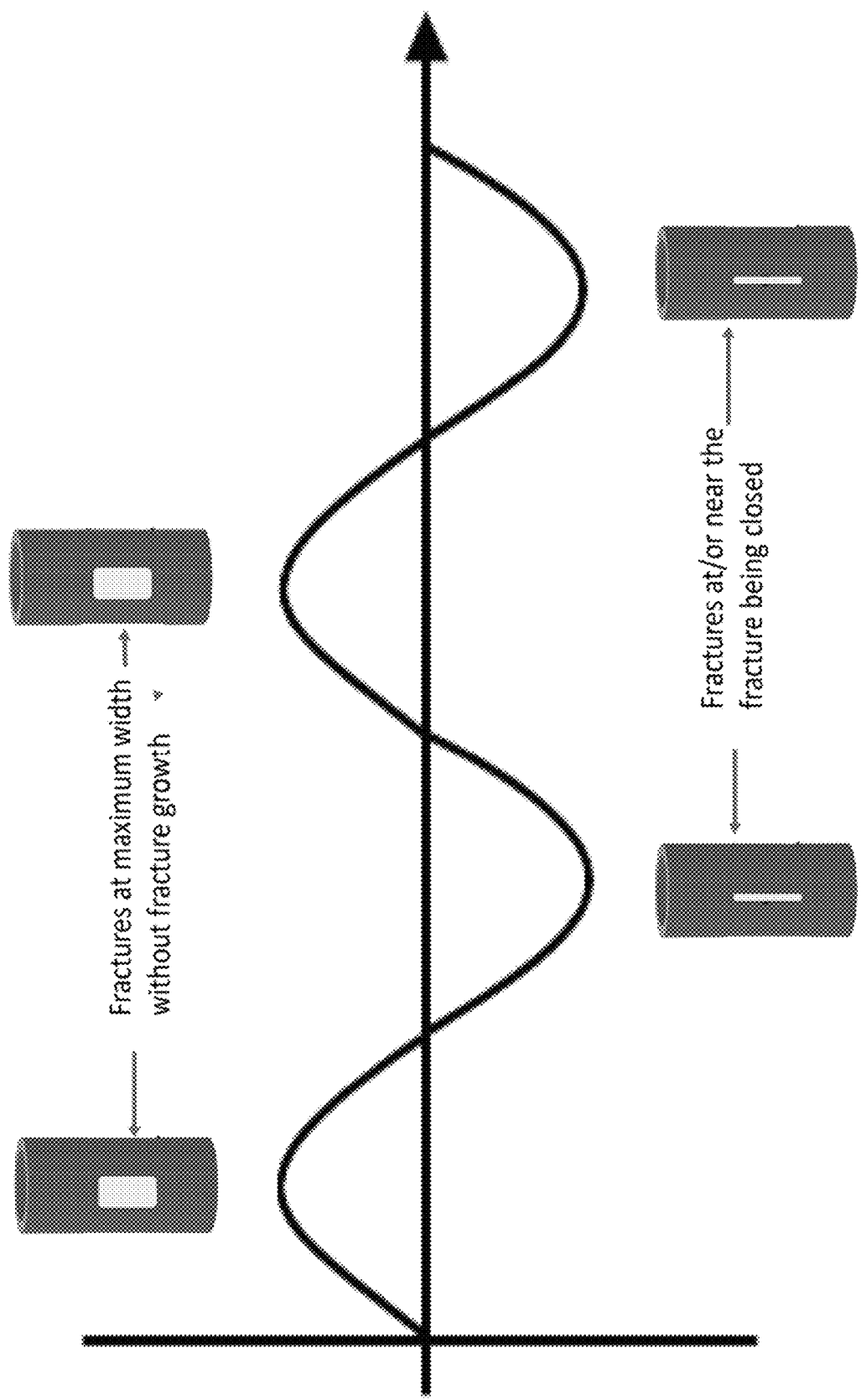
FIG. 19 is a figure depicting a geothermal downhole heat harvesting cycle.

FIGS. 18 and 19 show how a theoretical penny shaped fracture would behave at various stages of the pressure cycle as the fracture open up as pressure increase to allow more fluid in to the network and then contract and expel fluid as the pressures decrease. FIG. 18 shows a front view 10 of a penny shaped frack 3 growing around a perforation 2 in a casing 1; a side view 11 of a penny shaped frack 2 when the surface pressure on top of a hydrostatic head approaches fracture opening/closure pressure; a side view 12 of a penny shaped frack 2 when the surface pressure on top of a hydrostatic head is mid cycle; and a side view 13 of a penny shaped frack 2 when the surface pressure on top of a hydrostatic head approaches fracture propagation pressure.

Figure 20:
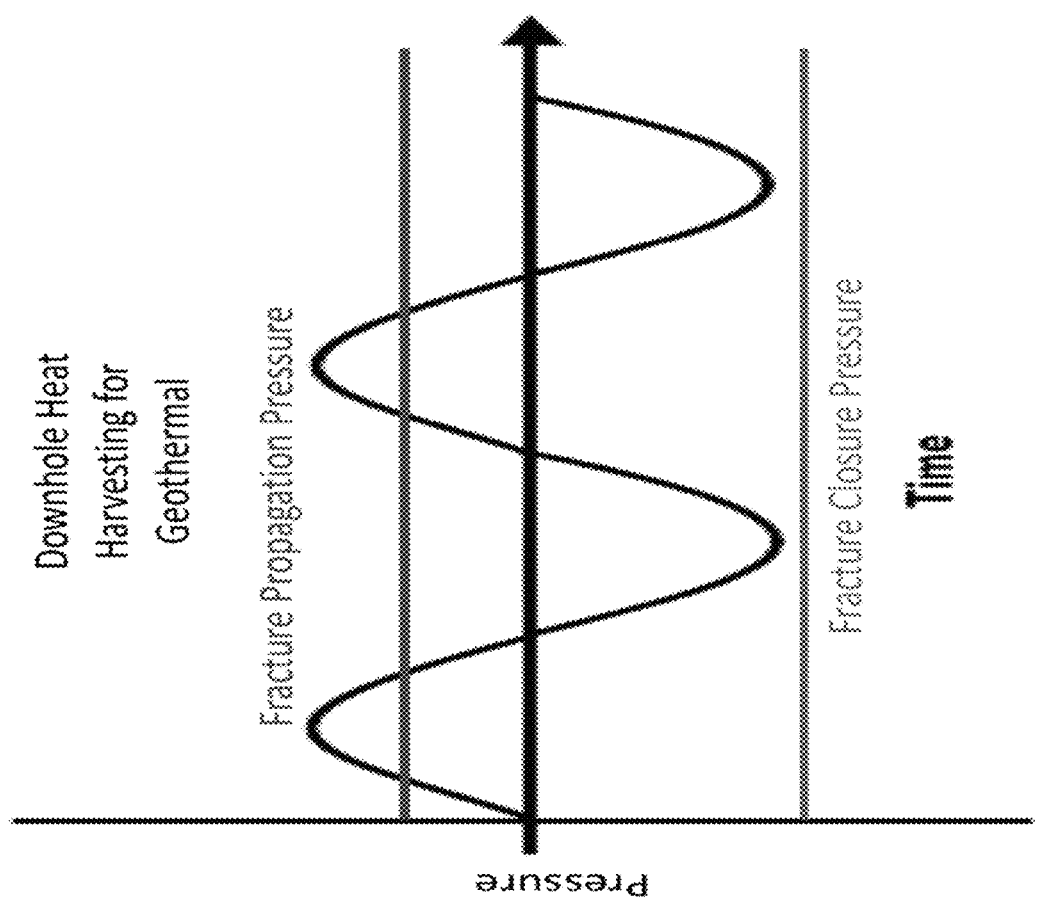
FIG. 20 is a figure depicting a downhole geothermal fluid heat harvesting process where new fracture area is created.

FIG. 20 demonstrates how the pressure can be increased beyond fracture propagation pressure during the pressure cycle to either extend the existing fracture network or create new fractures. This embodiment will be important as the well ages and the formation heat near the existing fracture faces is depleted. By extending the fracture network or creating new fractures, new formation faces can be exposed which have not had their heat depleted to the extent the existing fracture contact area has. By cycling the pressure on the formation in cycles where fracture propagation pressure is exceeded, existing down hole fractures can be extended or new fractures created. This new fracture area that is created will expose new and hotter rock face which has not yet had heat harvested.

Figure 21:
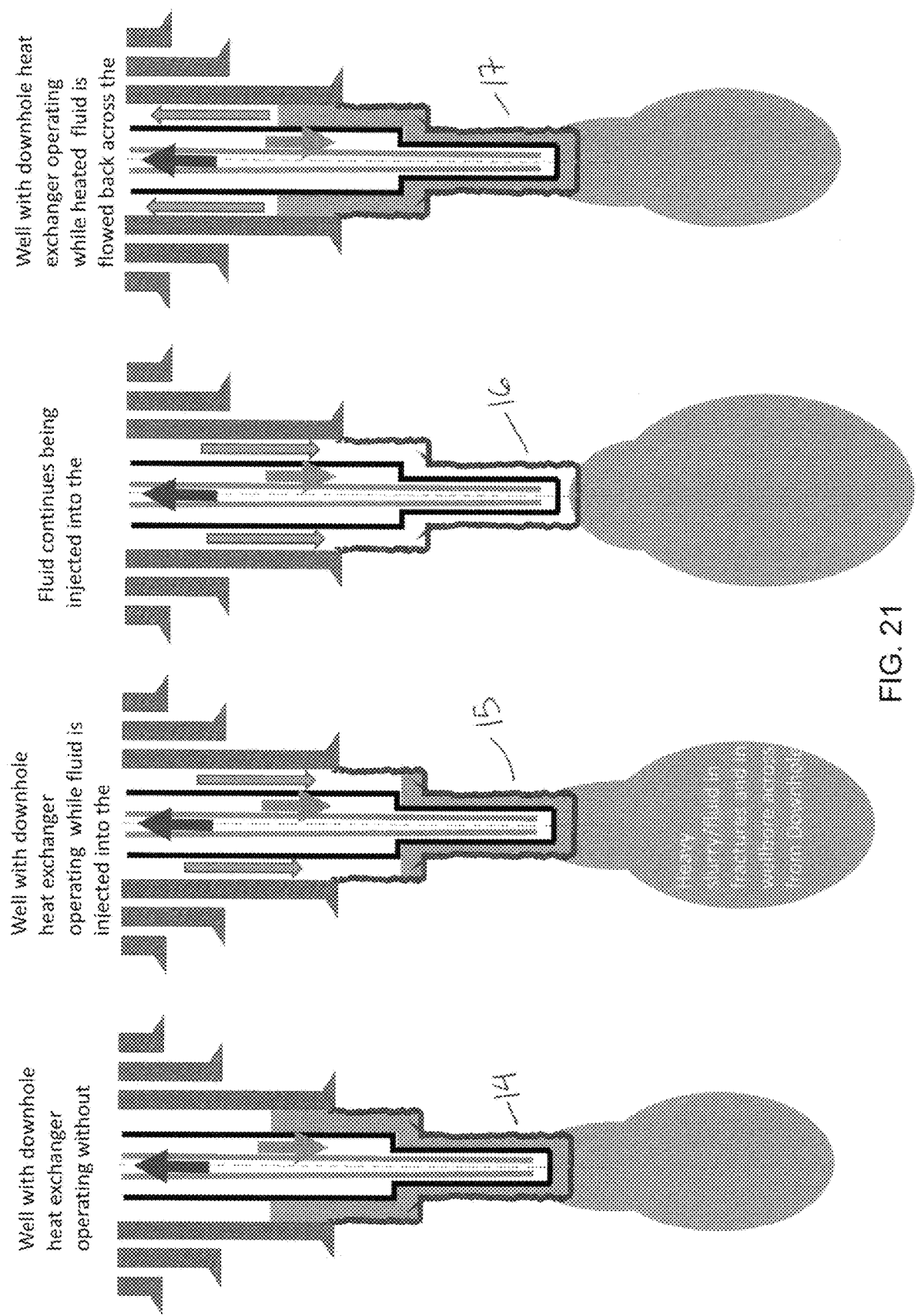
FIG. 21 is a figure depicting an embodiment of cyclic heat harvesting by injecting into formation fractures, heating, and flowing back fluids across downhole heat exchanger.

FIG. 21 shows an embodiment where the "breathing" process described above is executed in a well with a downhole heat exchanger. It can be seen that during the injection process fluid in the wellbore is injected in to the fracture network. Then, when the pressure is reduced, the heated fluid in the fractures is flowed back across the downhole heat exchanger. As the heat harvested will be used to generate electric power and power demand usually fluctuates on most electrical grids during the day, during off peak hours, fluid can be injected in to the fracture network for heating, Then, as power demand increases, the heated fluid can be flowed back across the downhole heat exchanger such that the thermal contrast at the heat exchanger is increased, allowing an increased ability to deliver power. FIG. 21 shows a well with a downhole heat exchanger 14; a well with a downhole heat exchanger operating while fluid is injected 15; a well where fluid continues to be injected 16 and a well with downhole heat exchanger operating while heated fluid is flowed 17.

Figure 22:
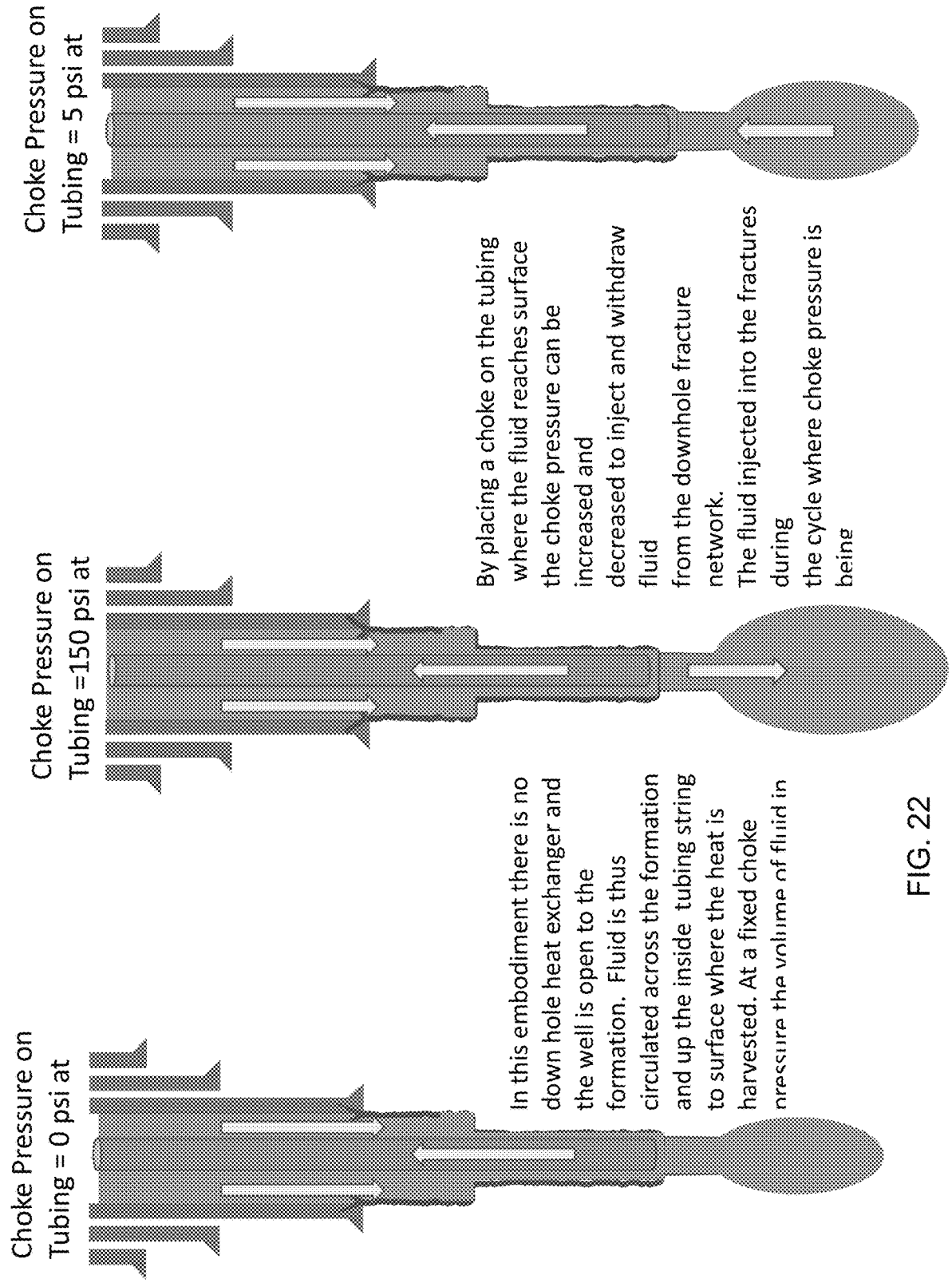
FIG. 22 is a figure depicting an embodiment of fracture heat harvesting without a downhole heat exchanger.

FIG. 22 shows an embodiment where the "breathing" process described above is executed in a well without a downhole heat exchanger. In this embodiment the fluid is circulated down the annulus, across the openhole, and up the open ended casing installed in the well. In this case the "breathing" is accomplished by opening and closing a choke on the flow exiting the well. As the choke is closed, the back pressure forces fluid into the fracture network to be heated. When the back pressure is reduced, the fractures begin to close, expelling heated fluid such that it can then be circulated out of the well and the heat harvested in surface facilities. By placing a choke on the tubing where the fluid reaches surface the choke pressure can be increased and decreased to inject and withdraw fluid from the downhole fracture network.

Figure 23:
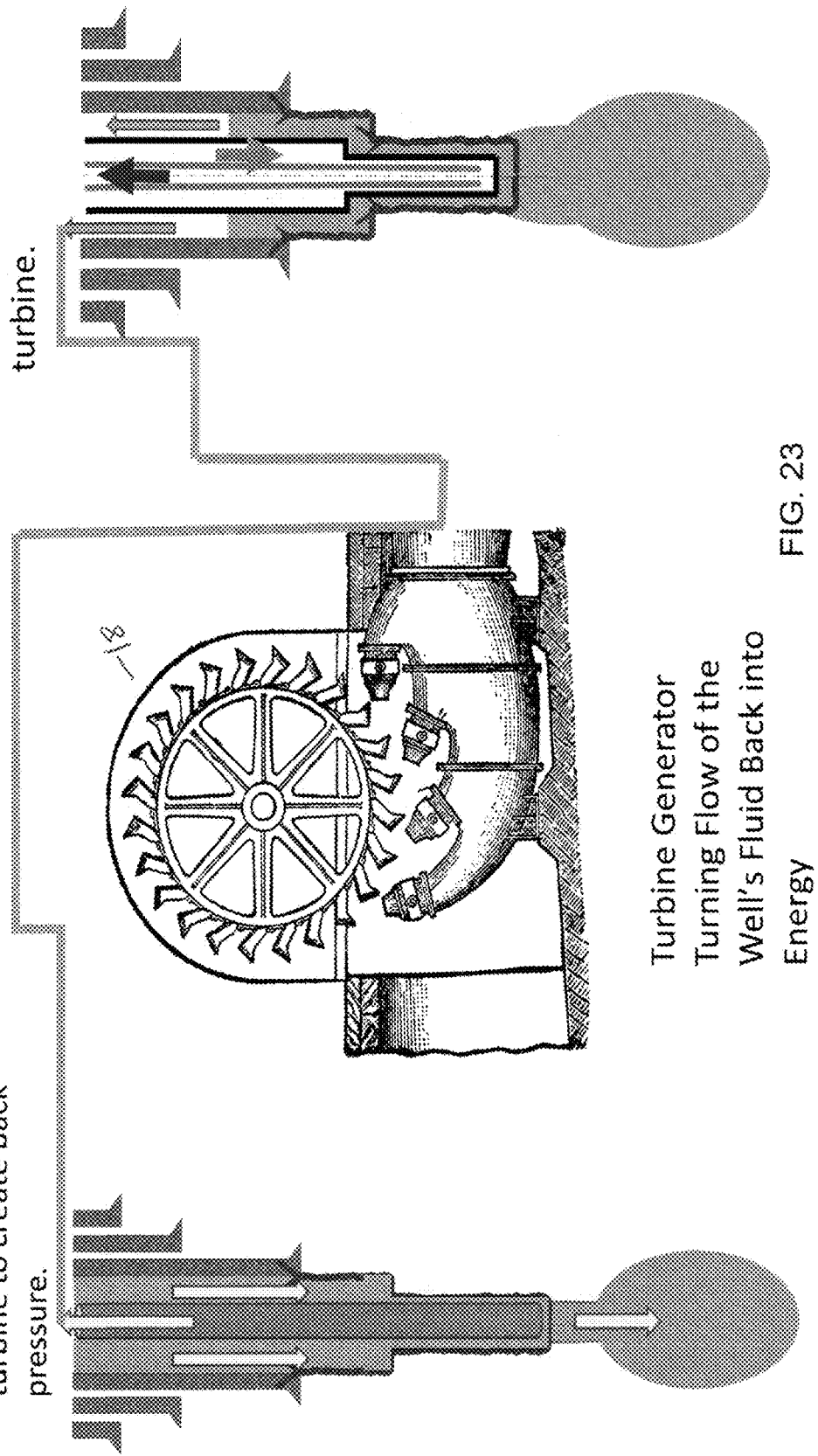
FIG. 23 is a figure depicting waste energy capture in the heat harvest process.

FIG. 23 shows an embodiment where the "breathing" process described above harvests flowback energy both from the downhole heat exchanger design and the system with no downhole heat exchanger. For the downhole heat exchanger case, a turbine is powered by the flowback fluid recovered at surface when the surface pressure on the hydrostatic head is reduced such that flow comes back to surface. For the case without the downhole heat exchanger the energy is salvaged by using a turbine or other power generation type device to create back pressure on the fracture network instead of a choke. In this embodiment, rather than a choke to create back pressure to drive fluid into the fracture network, flow can be diverted through a turbine to create back pressure. A turbine generator 18 is turning the flow of the well's fluid back into energy. In this embodiment, the flow back fluid can be used to run a turbine.

Figure 24:
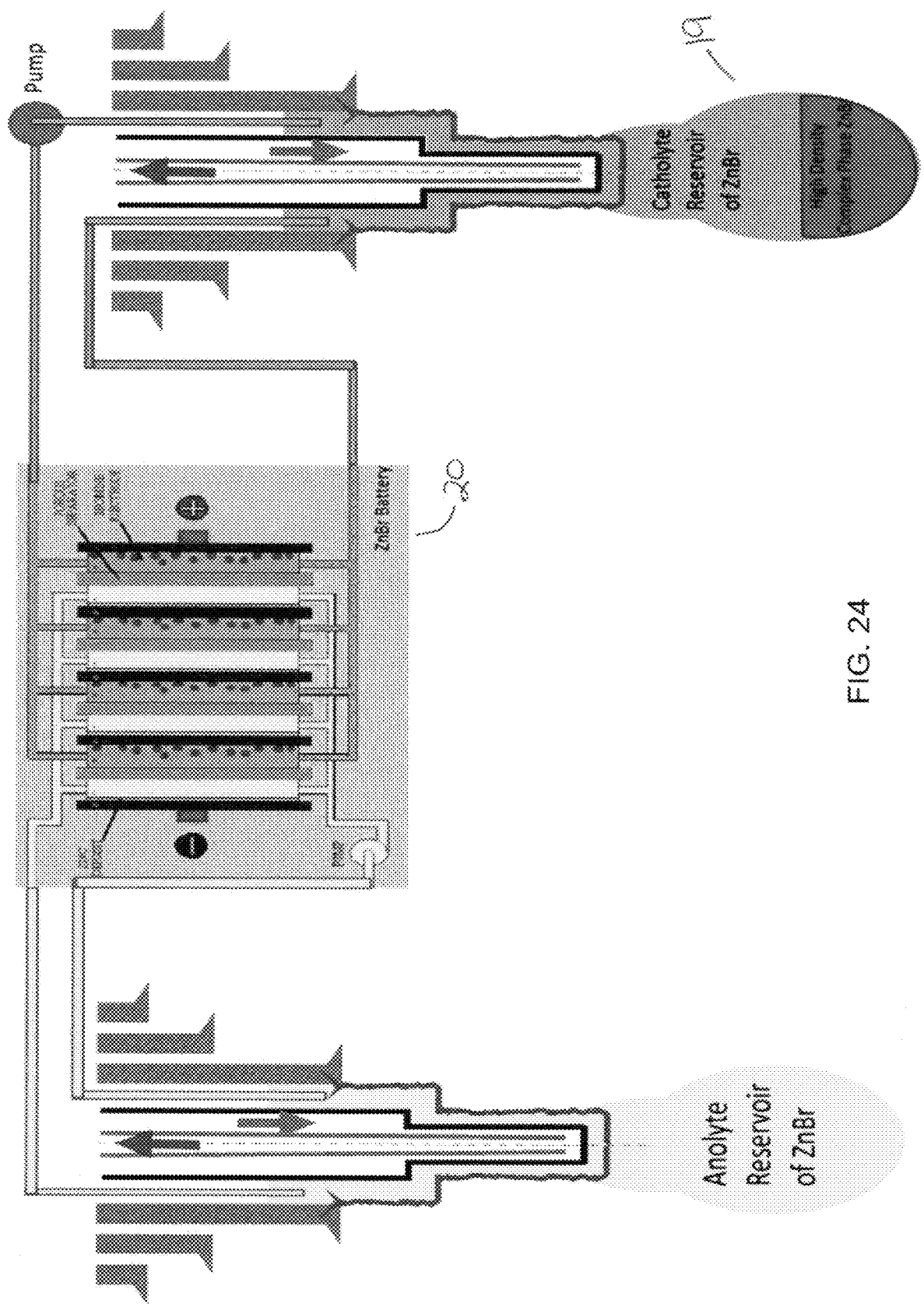
FIG. 24 is a figure depicting the use of two wells to create a large battery for energy storage.

FIG. 24 shows an embodiment where two wells are used to create a large battery for power storage during off peak hours. Zinc Bromide on its own, placed across the heat exchanger can be used to keep the fracture network open (above fracture opening pressure) or even used to create a hydrostatic head which will propagate existing fractures or create new fractures. ZnBr on its own is expensive. However, if it is also used to create a battery 20 to store power generated during off peak hours, it becomes a very viable fluid for use. FIG. 24 shows the high density complex ZnBr slurry migrating to the bottom of the well containing the ZnBr catholyte 19. However, in a preferred embodiment this heavy fluid will be separated at surface from the lighter catholyte brine (separator and storage not shown in the figure), while the lighter weight brine is pumped in to the well storing the catholyte brine. This high density brine stored at surface will then be used during the recharging process (the complex high density brine is created during the discharge process when power is being sent to the electrical grid). By coupling our geothermal well with a power storage battery such as the one described, off peak power can be generated and stored for delivery to the system during peak demand periods.

The present invention is directed to a method of controlling fracture growth in the extraction of geothermal energy from an underground formation, comprising;
(i) introducing a first fracking fluid into an underground formation;
(ii) introducing a second fracking fluid into the underground formation;
wherein the specific gravity of the second fracking fluid is different from the specific gravity of the first fracturing fluid, thereby controlling the growth of at least one fracture in a downward direction, wherein the fracking fluid in at least one of steps (i) or (ii) contains proppant particles having a thermal conductivity contrast of at least 5. The proppant particles preferably have a thermal conductivity contrast of at least 5 comprise tin, graphite, aluminum, hematite, bauxite, diamond, gold, silver, or a combination thereof. Alternatively, the proppant particles comprise tin, graphite, aluminum, hematite, bauxite, or a combination thereof. Alternatively, the proppant comprises tin.

In a preferred embodiment, the specific gravity of the second fracturing fluid is varied by increasing and decreasing the pounds per gallon of proppant particles per gallon of carrier fluid. The proppant particles preferably have a specific gravity of at least 3.0.

The specific gravity of the fracking fluid can be varied in the frack design to pump various slurry densities to obtain variable growth directions based on the geology encountered when the well is drilled. Zones at variable depths are open to be fracked during a single frack operation, and where each zone is fracked by varying the densities with the heavier density fluids accessing the deeper zones and the lighter slurries accessing shallower formations by design. Surface and/or downhole pressure and temperature information indicating fracture growth rate and direction can be used to vary slurry density to steer fracture growth in the real time.

In a preferred embodiment, surface and/or downhole pressure and temperature information indicating fracture growth rate and direction is used as input in to an automated manifold which automatically varies slurry densities being pumped downhole to steer fracture growth. Surface and/or downhole real time seismic information indicating fracture growth rate and direction can be used to vary slurry density to steer fracture growth. For example, surface and/or downhole real time seismic information indicating fracture growth rate and direction is input to an automated manifold which automatically varies slurry densities to steer fracture growth. Proppants of varying specific gravity can be used such that the proppant either sinks, is neutrally buoyant, or floats relative to the various density fluids being pumped during the fracture operation.

The invention is also directed to a downhole heat exchanger for a geothermal well, comprising a shaped casing designed to maximize the radial surface area of the casing deployed to maximize the heat harvest that can be achieved across a given length of formation.

The invention is also directed to a tubing string for a geothermal well, comprising a tubing string having an outer and interior surface, wherein the outer surface of the tubing string has screw shaped strakes, and wherein the strakes are capable of creating circumferential or helical movement of fluid contacting the tubing string to increase thermal convection and maximize heat harvest.

The invention is also directed to a downhole heat exchanger for a geothermal well, comprising a tubing, wherein the tubing comprises multiple return holes capable of splitting flow, reducing effective annular velocity rates, and improving heat exchange.

The invention is also directed to a method of constructing downhole heat exchanger where sections of the outer shell (casing) include at least one non-return valve so that formation can be fractured after casing is set, proppant particles and slurry are locked inside the fractures with no ability to flow back. The downhole heat exchanger can be made out of highly thermal conductive material such as aluminum alloy. The open hole may be fractured downward prior to the installation of casing and downhole heat exchanger. The casing (the outer shell of the downhole heat exchanger) is deployed in to the openhole and the fracture is then created, followed by the installation of the tubing to finish construction of the downhole heat exchange equipment. The downhole heat exchanger may be designed such that fluids circulated back to surface through the heat exchanger during heat harvesting operations never contact the downhole formation. In a preferred embodiment, the fracturing fluid is a Zinc Bromide brine mixed to a density which exceeds the fracture gradient of the formation to be fractured.

In a preferred embodiment, a solid particulate weighting agent may be added to the Zinc Bromide brine to further increase the density of fracking slurry. In a further preferred embodiment, the solid particulate weighting agent is Zinc Bromide salt, tin, graphite, aluminum, hematite, bauxite, diamond, gold, silver, or a combination thereof. In another preferred embodiment, the Zinc Bromide brine or weighted slurry is left in the open hole such that it acts as a conductive and/or convective fluid surrounding at least part of a downhole heat exchanger. In another preferred embodiment, particles of various specific gravities and/or thermal conductivity are allowed to settle around the outside diameter of a downhole heat exchanger in order to create a thermally conductive bed for efficient transfer of heat from the formation through the thermally conductive particle bed to the outside shell of the downhole heat exchanger.

The invention is also directed to a method of controlling fracture growth in the extraction of geothermal energy from an underground formation, comprising introducing a fracking fluid into an underground formation; wherein the specific gravity of the fracking fluid will create a pressure on the formation which exceeds the formation's fracture propagation pressure, thereby controlling the growth of at least one fracture in a downward direction, wherein the fracking fluid is a solids free brine on other high specific gravity fluid. In a preferred embodiment, a solids free brine or fluid has a thermal conductivity contrast of at least 5 comprising Zinc Bromide brine water, cesium formate brine, potassium formate brine, Bromal, Bromoform, Muthmanns solution, sodium polytungstate, Bromine, Thoulets solution, diiodomethane, indiumiodide, Bariummercuriciodide, Clerici solution, liquid metals (such as tin, gallium, indium, zinc alloy, or mercury) or a combination thereof. In a further preferred embodiment, proppant particles may be added, such as tin, graphite, aluminum, hematite, bauxite, or a combination thereof to further adjust the fluid's specific gravity. In another preferred embodiment, the fluid is molten tin.

In a preferred embodiment, the specific gravity of the fracturing fluid is varied by increasing and decreasing a brines density by varying the water or base fluid content. The specific gravity of the fracking fluid may be varied in the frack design to pump various densities to obtain variable growth directions based on the geology encountered and open to fracturing. In another embodiment, zones at variable depths are open to be fracked during a single frack operation, and where each zone is fracked by varying the densities with the heavier density fluids accessing the deeper zones and the lighter slurries accessing shallower formations by design. Surface and/or downhole pressure and temperature information indicating fracture growth rate and direction can be used to vary slurry density to steer fracture growth in real time. Surface and/or downhole pressure and temperature information indicating fracture growth rate and direction can also used as input in to an automated manifold which automatically varies slurry densities being pumped downhole to steer fracture growth. Surface and/or downhole real time seismic information indicating fracture growth rate and direction can be used to vary slurry density to steer fracture growth. Surface and/or downhole real time seismic information indicating fracture growth rate and direction can be input to an automated manifold which automatically varies slurry densities to steer fracture growth.

In a preferred embodiment, proppants of varying specific gravity are used such that the proppant either sinks, is neutrally buoyant, or floats relative to the various density fluids being pumped during the fracture operation. In another preferred embodiment, brine is left in the hole and replenished through the wellhead such that a hydrostatic head greater than fracture opening pressure is maintained on the fractured open hole. The brine can be left in the hole and supplemented until the hydrostatic head exceeds fracture propagation pressure, thus either extending existing fractures or creating new fracture.

In another preferred embodiment, a surface pressure is imposed on the hydrostatic head in the well such that as the surface pressure is increased fluid is forced in to the fracture network and where when the pressure is decreased fluid is expelled. In another preferred embodiment, the fluid expelled from the fracture network is heated. The heated fluid can flow across a downhole heat exchanger for harvest of the heat and its subsequent transport to surface. The heated fluid can enter an open ended tubular in the hole such that the heated fluid can be circulated to surface for heat harvest. Flow back fluids can be put through a turbine at surface to capture energy from the system. Circulated fluid that would normally go through a choke in order to control and vary back pressure on the formation can instead be put through a turbine at surface to create the required backpressure.

In a further preferred embodiment, two wells containing Zinc Bromide brine are configured such that a large battery is created such that power can be stored for later discharge during periods of peak power demand.

Example

A field implementation was conducted to demonstrate the concepts of controlling fracture growth in a downward direction. The objective was to minimize upward growth of the fracture in a horizontal wellbore with a true vertical depth between 5398 to 5424 and with treated perforations in the near horizontal section between 5491 and 5784 measured depth. The perforations being fracked were within the upper portion of a pay zone, which had weak frack barriers to vertical growth. In this case, batches of slurry were mixed to a density that exceeded the fracture propagation gradient in the open formation and alternated with the normal frack fluid carrying the proppant.

TABLE 1

Field Implementation Stages

| Stage | Poz Conc. (lb/gal) | Slurry Yield | Slurry Density (lb/gal) | Yield (cu. ft./sk) | Water Req. (gal/sk) | Stage Vol (gal) | Stage Vol (bbls) | Stg Poz (lbs) | Stg Poz (sks) | Stage Water (gal) | Stage Water (bbls) |
|---|---|---|---|---|---|---|---|---|---|---|---|
| 1 | 2 | 1.10 | 9.49 | 4.42 | 28.94 | 2100 | 50 | 3673.15 | 63 | 1837 | 44 |
| 2 | 15.9 | 1.45 | 16.77 | 1.229 | 5.9 | 840 | 20 | 8564.27 | 91 | 539 | 13 |
| 3 | 2 | 1.10 | 9.49 | 4.42 | 28.94 | 2100 | 50 | 3673.15 | 63 | 1837 | 44 |
| 4 | 15.9 | 1.45 | 16.77 | 1.229 | 5.9 | 1680 | 40 | 17128.53 | 183 | 1077 | 26 |
| 5 | 4 | 1.20 | 10.37 | 2.56 | 15.04 | 4200 | 100 | 13183.50 | 219 | 3296 | 78 |
| 6 | 15.9 | 1.45 | 16.77 | 1.229 | 5.9 | 2520 | 60 | 25692.80 | 274 | 1616 | 38 |
| 7 | 6 | 1.30 | 11.11 | 1.92 | 10.25 | 8400 | 200 | 35939.06 | 584 | 5990 | 143 |
| 8 | 15.9 | 1.45 | 16.77 | 1.229 | 5.9 | 2730 | 65 | 27833.86 | 297 | 1751 | 42 |
| 9 | 8 | 1.40 | 11.74 | 1.59 | 7.73 | 63000 | 1500 | 327285.28 | 5292 | 40911 | 974 |
| 10 | 2 | 1.10 | 9.49 | 4.42 | 28.94 | 8736 | 208 | 15280.32 | 264 | 7640 | 182 |
| 11 | KCL | | | | | 1680 | 40 | | | | 40 |
| TOTAL | | | | | | 97986 | 2333 | 478,254 | 7331 | 66492 | 1623 |

As can be seen in the table in Table 1, a slurry with 2 pounds per gallon of proppant was mixed with fresh water and 2% KCl to initiate the fracture, giving a slurry with a density of 9.49 pound per gallon, which is well below fracture propagation pressure and which would have, as explained in FIG. 1 with a sample of such an occurrence shown in FIG. 5, a bias to grow upward until it met a strong fracture growth barrier. A fracture dominated by upward growth would have been problematic for this horizontal well due to its location high in the pay zone.

The light slurry was pumped first to create a large enough fracture with a low solids slurry so that the slurries to follow, with higher densities of solids, would have more area to divert to in case any particular area of the fracture bridged off with solids. This light slurry was then followed by a slurry of 2% KCl water weighted with 15.9 pounds per gallon of barite added to create a slurry of 16.77 pounds per gallon which exceeded the fracture propagation gradient of the formation. This heavy slurry was then followed by another batch of KCl water mixed with 2 pounds per gallon of proppant. This alternating cycle of lighter slurries of proppant and heavy slugs of 16.77 pound per gallon was repeated as per Table 1 such that the lower portion of the vertical fracture created was filled with a fluid with a gradient higher than the fracture propagation pressure for the formation so the fracture would tend to grow down and out, with minimal upward growth. These heavier slurries, once exited the perforations and entered into the fracture, naturally migrated to the lower portion of the fracture due to gravity segregation. By keeping the lower portion of the hole filled with a heavy slurry, fracture growth is ensured to be biased toward downward growth as is explained in FIGS. 3 and 4.

Figure 7:
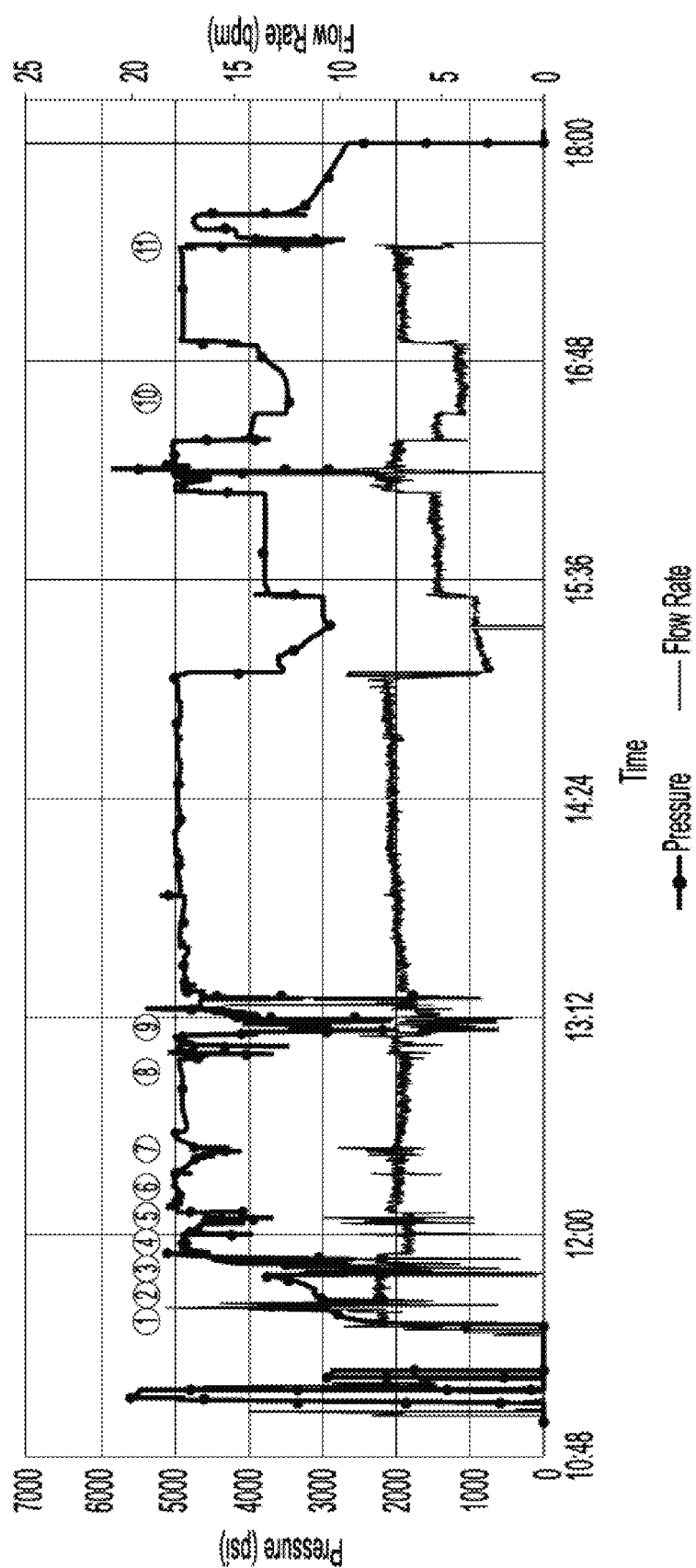
FIG. 7 is a graph of surface pressure vs. time for a fracking operation.

As can be seen in FIG. 7 from pressure data, once the hydrostatic gradients stabilized in between changes in the densities of the slurries pumped, the surface pressure never showed a consistent decline that would have occurred had fracture growth been in an upward direction. Once the final 1500 barrels of 11.74 pound per gallon slurry with proppant was being pumped, if there was any indication of upward growth of the fracture (i.e. if surface pump pressure had begun to decline over time while using a constant pump rate), another heavy 16.77 ppg slurry could be pumped to mitigate, if not terminate, the upward growth and continued lateral and/or downward fracture growth. However, the schedule of slurries pumped was effective as designed.

This field application also proved that this approach can be easily implemented in the field and that formations are easily fractured with these high-density slurries. This well was in a remote location and produced natural gas at a significant rate when tested.

Alternatively, according to the present invention for geothermal applications, the above method can be modified for the conditions of extracting geothermal energy. Fracture can be more aggressively grown downward by pumping a larger percentage of the heavy fluid and/or the slurry is weighted to a much higher density (above the 16.77 ppg pumped) using a high specific gravity particulate with good thermal conductivity contrast as compared to the formation being fractured.

For example, the high specific gravity particulate may comprise tin, barite, hematite, graphite, or any other high specific gravity particulate with good thermal conductivity contrast as compared to the formation be fractured.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more elements of the exemplary embodiments may be omitted, combined with, or substituted for, in whole or in part, one or more elements of one or more of the other exemplary embodiments. Accordingly, the scope of protection is not limited to the embodiments described, but is only limited by the claims that follow, the scope of which shall include all equivalents of the subject matter of the claims.

What is claimed:

1. A method of controlling fracture growth in the extraction of geothermal energy from an underground formation, comprising;
   (i) introducing a first fracking fluid into an underground formation;
   (ii) introducing a second fracking fluid into the underground formation;
   wherein a specific gravity of the second fracking fluid is different from a specific gravity of the first fracking fluid, thereby controlling the growth of at least one fracture in a downward direction;
   wherein the first fracking fluid and the second fracking fluid in at least one of steps (i) or (ii) contains proppant particles having a thermal conductivity contrast of at least 5; and,
   wherein at least one of the first fracking fluid and the second fracking fluid is a Zinc Bromide brine mixed to a density which exceeds a fracture gradient of a formation to be fractured.

2. The method of claim 1, wherein the proppant particles having a thermal conductivity contrast of at least 5 comprise at least one of tin; graphite;
   aluminum; hematite; bauxite; diamond; gold; and silver.

3. The method of claim 2, wherein the proppant particles comprise at least one of tin; graphite; aluminum; hematite; and bauxite.

4. The method of claim 3, wherein the proppant particles comprise tin.

5. The method of claim 1, wherein the specific gravity of the second fracking fluid is varied by increasing and decreasing a pounds per gallon of proppant particles per gallon of a carrier fluid.

6. The method of claim 1, wherein the proppant particles have a specific gravity of at least 3.0.

7. The method of claim 1, wherein the proppant particles comprise a specific gravity such that the proppant particles one of a) sinks, b) is neutrally buoyant, and c) floats relative to density of a fluid being pumped during a fracture operation.

8. The method of claim 1, wherein a solid particulate weighting agent is added to the Zinc Bromide brine to increase a density of at least one of the first fracking fluid and the second fracking fluid.

9. The method of claim 8, wherein the solid particulate weighting agent is at least one of a Zinc Bromide salt; tin; graphite; aluminum; hematite;
   bauxite; diamond; gold; and silver.

10. The method of claim 1, wherein the Zinc Bromide brine is left in an open hole as at least one of a conductive and a convective fluid surroundscurrounding at least part of a downhole heat exchanger.

11. The method of claim 7, wherein the proppant particles are configured to settle around an outside diameter of a downhole heat exchanger to create a thermally conductive bed.

* * * * *